US010012346B2

(12) United States Patent
Killion et al.

(10) Patent No.: US 10,012,346 B2
(45) Date of Patent: Jul. 3, 2018

(54) MAGNETIC CLIP

(71) Applicant: Thomas Killion, Indianapolis, IN (US)

(72) Inventors: Thomas Killion, Indianapolis, IN (US); Sam Werth, Indianapolis, IN (US); John Pell, Danville, IN (US)

( * ) Notice: Subject to any disclaimer, the term of this patent is extended or adjusted under 35 U.S.C. 154(b) by 250 days.

(21) Appl. No.: 14/583,516

(22) Filed: Dec. 26, 2014

(65) Prior Publication Data

US 2015/0219130 A1   Aug. 6, 2015

Related U.S. Application Data

(60) Provisional application No. 61/921,081, filed on Dec. 27, 2013.

(51) Int. Cl.
| | |
|---|---|
| *F16B 2/10* | (2006.01) |
| *F16M 13/02* | (2006.01) |
| *B42F 1/02* | (2006.01) |
| *B42F 1/00* | (2006.01) |

(52) U.S. Cl.
CPC ........... *F16M 13/022* (2013.01); *B42F 1/006* (2013.01); *B42F 1/02* (2013.01); *B42P 2241/10* (2013.01); *Y10T 24/44444* (2015.01)

(58) Field of Classification Search
CPC ...... B42F 1/006; B42F 1/02; Y10T 24/44444; Y10T 24/44376; Y10T 24/44385; Y10T 24/44462
See application file for complete search history.

(56) References Cited

U.S. PATENT DOCUMENTS

| | | | |
|---|---|---|---|
| 4,175,306 A * | 11/1979 | Bigelow | A47G 25/485 24/507 |
| D271,850 S | 12/1983 | Einhorn et al. | |
| D274,127 S | 6/1984 | Einhorn et al. | |

(Continued)

*Primary Examiner* — Robert J Sandy
*Assistant Examiner* — Matthew Sullivan
(74) *Attorney, Agent, or Firm* — E. Victor Indiano; Indiano & McConnell, LLC

(57) ABSTRACT

A clip for selectively gripping objects includes a first body member having a forward portion, a rearward portion and a middle portion disposed between the forward and rearward portions. The first body member includes an exteriorly facing surface and an interiorly facing surface, with the forward portion including an interiorly facing gripping jaw, and the middle portion including a strengthening member. A second body member includes a forward portion, a rearward portion, and a middle portion disposed between the forward and rearward portion. Second body member also includes an exteriorly facing surface and an interiorly facing surface, a forward portion that includes an interiorly facing gripping jaw, and a middle portion that includes a strengthening member. A biasing member urges the gripping jaws of the first and second body members into engagement. A pivot assembly pivotably couples the first body member to the second body member to permit the gripping jaws to pivot between an engaged position and a released position. The first strengthening member has an arcuately convex surface and the second strengthening member includes an arcuately concave surface that is sized and positioned to slideably engage the arcuately convex surface of the first body.

20 Claims, 24 Drawing Sheets

(56) References Cited

U.S. PATENT DOCUMENTS

| | | | | |
|---|---|---|---|---|
| 4,840,341 A * | 6/1989 | Hasegawa | ............... | B42F 1/02 |
| | | | | 211/89.01 |
| 4,959,892 A * | 10/1990 | Wang | ................. | A44B 99/00 |
| | | | | 24/489 |
| 5,301,393 A * | 4/1994 | Brown | ................. | B42F 1/02 |
| | | | | 24/499 |
| 5,318,292 A * | 6/1994 | De Marco | ............ | A44B 99/00 |
| | | | | 24/3.11 |
| D408,097 S * | 4/1999 | Heydt | ...................... | D27/183 |
| 6,302,366 B1 * | 10/2001 | Saylor | .................. | B42F 1/006 |
| | | | | 24/489 |
| 6,612,000 B2 * | 9/2003 | Housley | .............. | A47G 25/485 |
| | | | | 223/91 |
| 6,754,937 B1 * | 6/2004 | Martin | .................. | B42F 1/006 |
| | | | | 24/351 |
| D512,906 S | 12/2005 | Wood | | |
| 7,322,550 B2 | 1/2008 | Killion | | |
| D580,983 S | 11/2008 | Cetera | | |
| 7,469,869 B2 | 12/2008 | Killion | | |
| 8,201,310 B1 * | 6/2012 | Abdi | .................. | A47G 25/48 |
| | | | | 24/499 |
| 8,234,759 B2 * | 8/2012 | Enga | ................... | B43K 23/001 |
| | | | | 24/351 |
| 8,348,251 B2 * | 1/2013 | Gallo | ................... | D05B 35/02 |
| | | | | 24/507 |
| 8,763,214 B2 * | 7/2014 | Yang | ..................... | B25B 5/06 |
| | | | | 24/500 |
| 2007/0193211 A1 * | 8/2007 | Harrison | ............. | A45C 13/08 |
| | | | | 52/750 |
| 2011/0314643 A1 | 12/2011 | Huang | | |

* cited by examiner

MAGNETIC CLIP

PRIORITY CLAIM

The instant application claims benefit of priority to Thomas Killion and John Pell and Sam Werth U.S. Provisional Patent Application Ser. No. 61/921,081 that was filed on 27 Dec. 2013, and which is fully incorporated herein by reference.

I. TECHNICAL FIELD OF THE INVENTION

The present invention relates to clips, and more particularly, to spring biased clips of the type used for gripping objects, such as papers, flaps of snack bags and photographs within the jaws of the clip.

II. BACKGROUND OF INVENTION

A large variety of clips exist currently. Many of these clips include magnets to facilitate the clips being coupled to a magnetizable surface such as a refrigerator door or file cabinet. Examples of magnetic clips are shown in the following patents and patent applications:

Cetera, U.S. Design Pat. No. D580,983; Einhorn et al., U.S. Design Pat. No. D271,850; Einhorn et al., U.S. Design Pat. No. D274,127; Wood, U.S. Design Pat. No. D512906; Huang, U.S. Patent Application No. 2011/0314643; Killion, U.S. Pat. No. 7,469,869; and Killion, U.S. Pat. No. 7,322,550.

The magnetic clips listed above typically include a first and second member that are pivotably coupled together. A pivot assembly pivotably mates the first member to the second member. The first member is arbitrarily referred to herein as the lower or based member; and the second member is arbitrarily referred to herein as the upper member by a pivot assembly. A magnet is provided for enabling either of the upper or lower member (but usually the lower member), to be magnetically attached to a magnetizable surface such as a refrigerator door.

Wood Design Pat. No. D512906 is one of the most commonly encountered magnetic clips today, wherein the pivot member includes a pair of upstanding pivot bases that are formed on the lower member, and a pair descending pivot bases that are formed on the upper member. The upper and lower pivot bases all include alignable apertures. A pivot pin is extendable through the apertures in the upper and lower pivot bases to pivotably couple the upper and lower pivot bases, and hence, the upper and lower members together. A coil spring has a first end that engages the underside surface of the upper member, and a second end that engages the upper side surface of the lower member. The middle portion of the spring member comprises a plurality of coils that are sized for interiorly receiving the pivot pin.

The spring member serves to bias the object engaging jaws of the upper and lower members to engage each other, and the leverage ends of the clip are biased to be maintained in a spaced relationship. By squeezing together the rearward or leverage ends of the upper and lower members, the jaws at the forward end of the clip are separated, to enable one to insert or remove papers or other materials from the gap between the jaws.

In contrast to the clip shown in Wood, the device shown in the Killion '869 patent contains no springs, but rather relies on magnetic attraction between a first magnet that is held in the upper member and a second magnet that is held in the lower member to attract the jaw ends of the upper and lower members together, so that they will be biased to enable them to hold papers or other materials between the jaws.

Although the devices described above perform their intended functions in a workmanlike manner, room for improvement exists. In particular, room for improvement exists for providing a device that is both sturdy and easy to assemble.

For example, one difficulty with devices such as the Wood '906 device is that it is often difficult to insert the pin through the four apertures of the respective upper and lower base members, while also threading the pin through the spring, so that the pin extends through the center of the coils, and while fighting the spring force exerted on the leverage ends of the members.

Another difficulty relates to strength. For many of the devices, the pivot pin receiving base members are not well suited to withstand harsh forces that may be exerted on the clip. For example, the devices have often been known to break when dropped or when stepped on.

One object of the present invention is to provide a device that is easy to assemble, and that also has strength so as to better resist breaking when forces are exerted on the clip, such as the clip being dropped from several feet above the ground, or the device being stepped on.

III. SUMMARY OF THE INVENTION

In accordance with the present invention, a clip is provided for selectively gripping objects. The clip includes a first body member having a forward portion, a rearward portion and a middle portion disposed between the forward and rearward portions. The first body member also includes an exteriorly facing surface and an interiorly facing surface, with the forward portion including an interiorly facing gripping jaw, and the middle portion including a strengthening member. A second body member is provided that includes a forward portion, a rearward portion, and a middle portion disposed between the forward and rearward portions. The second body member also includes an exteriorly facing surface and an interiorly facing surface, a forward portion that includes an interiorly facing gripping jaw, and a middle portion that includes a strengthening member. A biasing member is provided for urging the gripping jaw of the first body member into engagement with the gripping jaw of the second body member. A pivot assembly is provided for pivotably coupling the first body member to the second body member to permit the gripping jaws of the first and second body members to pivot between an engaged position and a released position. The first strengthening member includes a first strengthening member having an arcuately convex surface. A second strengthening member includes an arcuately concave surface that is sized and positioned to slideably engage the arcuately convex surface of the first body member.

In a preferred embodiment, the first body member includes an exteriorly extending perimetral lip, with the convex surface of the first strengthening member being formed as a part of the perimetral lip. The second strengthening member can include a perimetral lip that includes the arcuately concave surface.

One of the arcuately concave surface and arcuately convex surface can include a trench, with the other of the arcuately concave surface and arcuately convex surface including a ridge that is configured to be slideably engageable into the trench for maintaining the engagement between the first and second body members.

In accordance with another aspect of the present invention, a clip member is provided that comprises a first clip member, a body member and a second body member, with a pivot assembly for pivotably coupling the first and second body members. A biasing member is provided for biasing the first and second body members into a jaw engaging position. A strengthening member is provided that includes a concave portion disposed on one of the first body member and second body member and a convex portion disposed on the other of the first and second body members. The concave and convex portions are positioned and configured to engage with each other, and for bearing a load imposed on the first and second body members.

One feature of the present invention is that first and second strengthening members are provided that include engageable convex and concave surfaces.

This feature has the advantage of providing additional strength to the device, by enabling the strengthening members to absorb a portion of the load that is imposed upon either one or both of the first and second body members. By absorbing part of the load that is imposed on the first and second body members at times such as when the clip is either stepped on, or falls, the strengthening members reduce the load that is absorbed by the pivot assembly which helps to maintain the clip, and prevent it from breaking. In this way, the clip of the present invention is believed to have enhanced sturdiness, when compared to some prior known clips.

These and other features and advantages of the present invention will become apparent to those skilled in the art upon a review of the drawings and Detailed Description that are presented herein.

IV. BRIEF DESCRIPTION OF DRAWINGS

V. DETAILED DESCRIPTION

Figure 1:
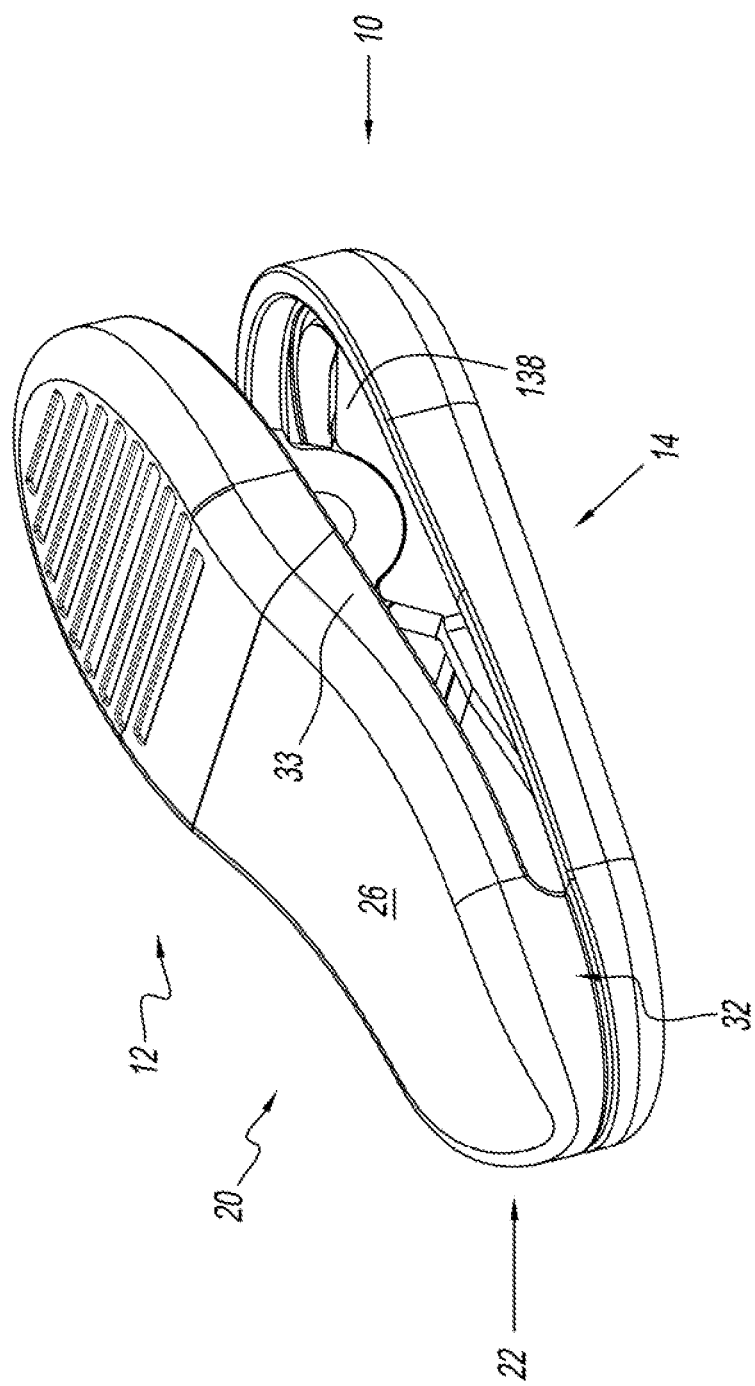
FIG. 1 is a perspective view of a magnetic clip of the present invention.

The description that follows describes, illustrates and exemplifies one or more particular embodiments of the present invention in accordance with its principles. This description is not provided to limit the invention to the embodiment or embodiments described herein, but rather to explain and teach the principles of the invention in such a way to enable one of ordinary skill in the art to understand these principles and, with that understanding, be able to apply them to practice not only the embodiment or embodiments described herein, but also other embodiments that may come to mind in accordance with these principles.

The scope of the present invention is intended to cover all such embodiments that may fall within the scope of the appended claims, either literally or under the doctrine of equivalents. Unless otherwise noted, directional terms such as upper, lower forward, rearward exterior and interior should be read broadly enough to understand that the others are being used to clarify the description and provide indications of the relative positions of various components, but that the terms are neither being used as absolutes or as words of limitation, as from a different perspective the terms could well be reversed (e.g. forward is rearward) without departing from the scope and spirit of the present invention, or departing from the coverage of the claims appended hereto.

It should be noted that in the description and drawings, like or substantially similar elements may be labeled with the same reference numerals. However, sometimes these elements may be labeled with differing reference numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose.

Furthermore, certain views are side views which depict only one side of the device (or one set of components of a multi set array of components), but it will be understood that the opposite side and other component sets are often preferably identical thereto, or mirror images thereof. The present specification is intended to be taken as a whole and interpreted in accordance with the principles of the present invention as taught herein and understood by one of ordinary skill in the art.

A magnetic clip 10 of the present invention is shown in the FIGS. 1-15 as including a first or upper body member 12, that is pivotably coupled to a second or lower body member 14. The first and second body members 12, 14 are pivotable about a pivot assembly between an engaged position such as is shown in FIG. 1, where the forward jaws 13, 15 of the magnetic clip 10 are placed in close engagement; and a release position, wherein the forward jaws 13, 15 of the first and second members 12, 14 respectively are in a released position wherein the jaws 13, 15 are spatially separated.

When in the engaged position, the tight engagement between the first 13 and second 15 forward jaws of the first and second body members 12, 14 enables the device to grip objects, such as papers, pictures open flaps of bags such as snack bags, bread bags and the like. When in the released position, the forward jaws 13, 15 of the first and second body members 12, 14 are spatially separated to enable the user to remove materials from engagement with the jaws 13, 15, and to insert objects, such as papers, photographs, bags of potato chips, etc., between the jaws 13, 15. The subsequent release of the first and second body members will bias the forward jaws 13, 15 back into the engaged position where the jaws are in engagement with each other, so that they can grip the grasped object.

Although the first and second body members 12, 14 and jaws 13, 15 are referred to herein as "upper" 12, 13 and "lower" 14, 15 members and jaws, it should be understood that the terms upper and lower are used arbitrarily and not to define any particular location or orientation. As will be discussed in more detail below, the lower (second) body member 14 has a generally flattened base, that makes it better adapted for placement against an object to which it is attached, such as a surface of a refrigerator, table top or the like. In contrast, the upper surface of the first or upper body member 12 is often curved to facilitate its pivoting about the pivot assembly. This curvature tends to make it less well suited for flushly engaging a planar surface, such as a table top or refrigerator door than the planar base of the second or lower member 14.

The upper body member 12 includes a body 20, having a first or forward end 22, that includes the jaws 13 for gripping the object to be grabbed, such as a photograph or papers. The body 20 also includes a rearward end portion 24 that is designed to be grasp by the user so that the first and second body members 12, 14 can be pivoted between the engaged position (FIG. 1) wherein the jaws are engaged, to the opened (release) position wherein the jaws 13, 15 are separated.

Figure 2:
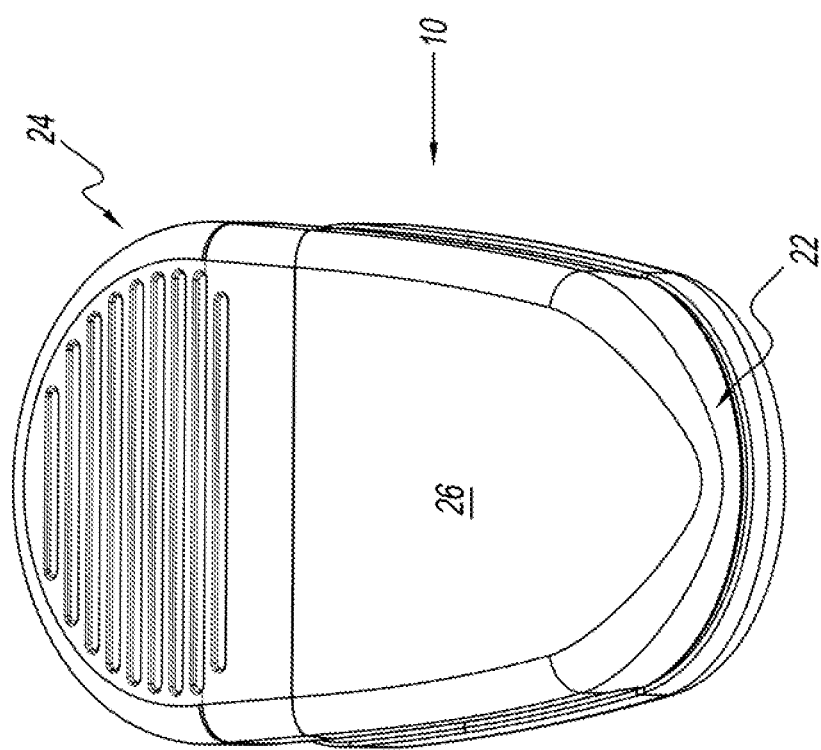
FIG. 2 is a frontal, perspective view thereof.
Figure 3:
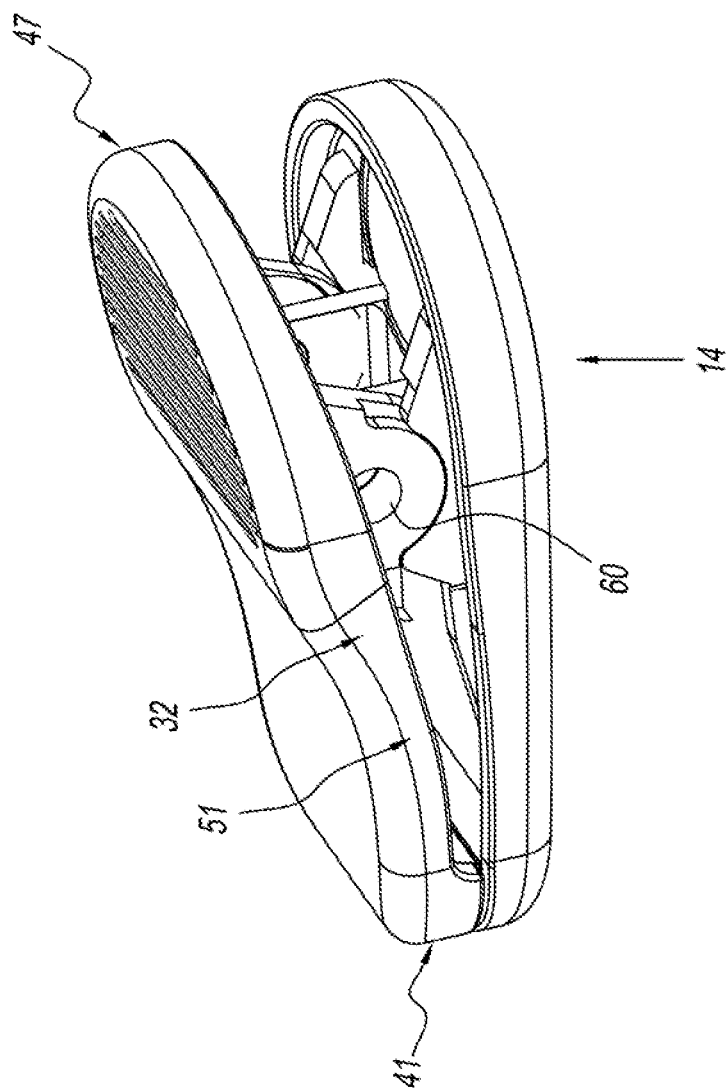
FIG. 3 is a side, slightly rearwardly oriented view of the magnetic clip of the present invention.
Figure 4:
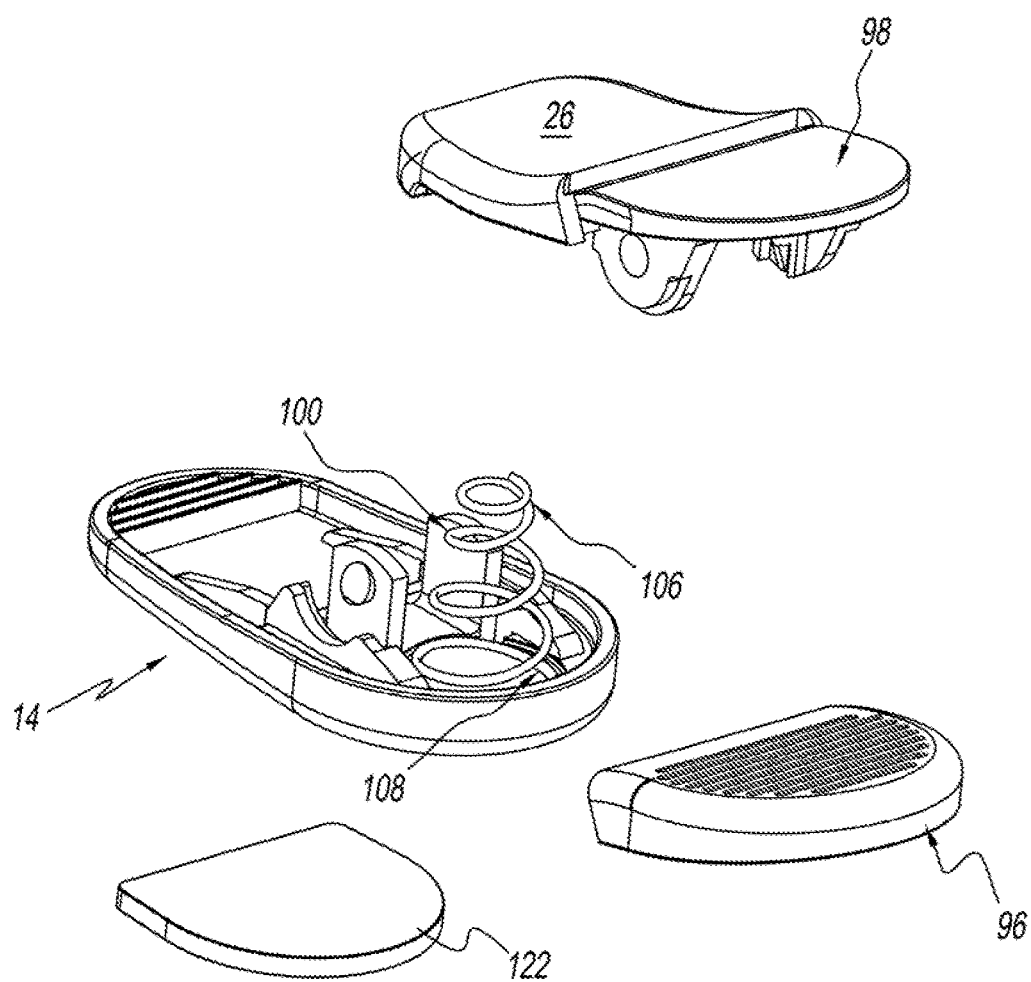
FIG. 4 is an exploded, rearwardly oriented view thereof.
Figure 5:
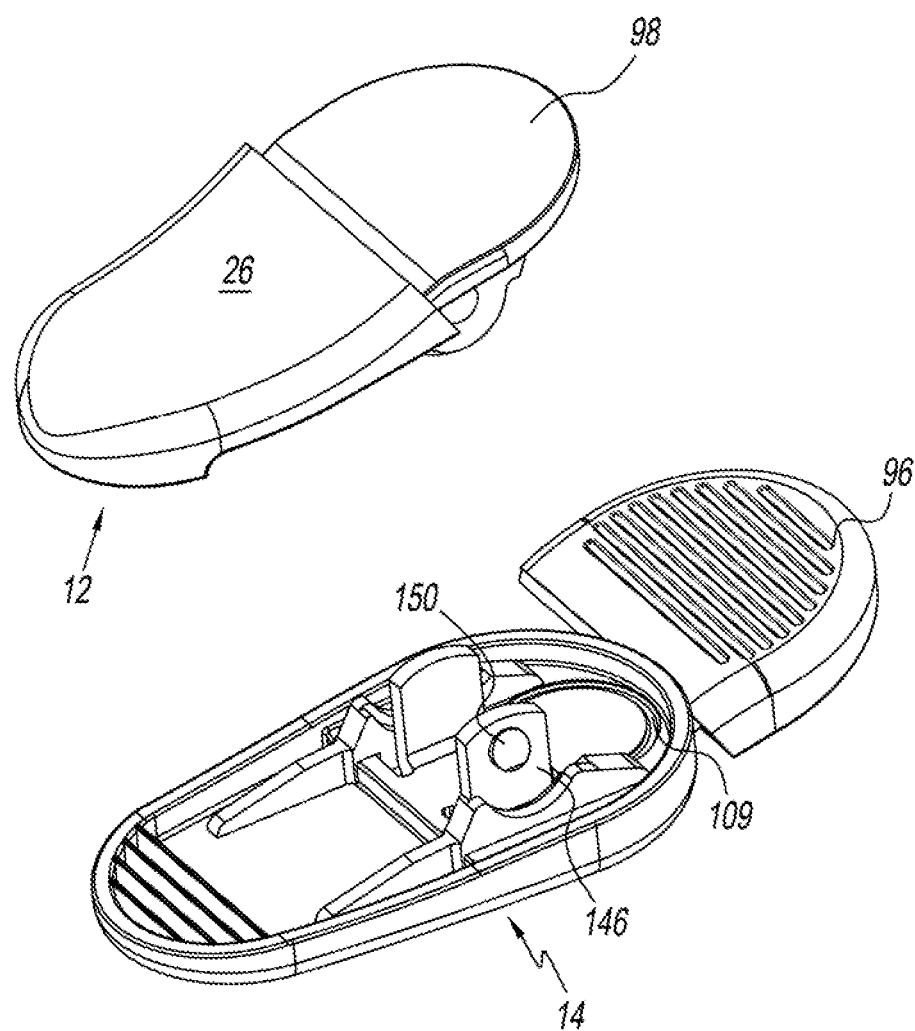
FIG. 5 is an exploded, top oriented view of the present invention.
Figure 6:
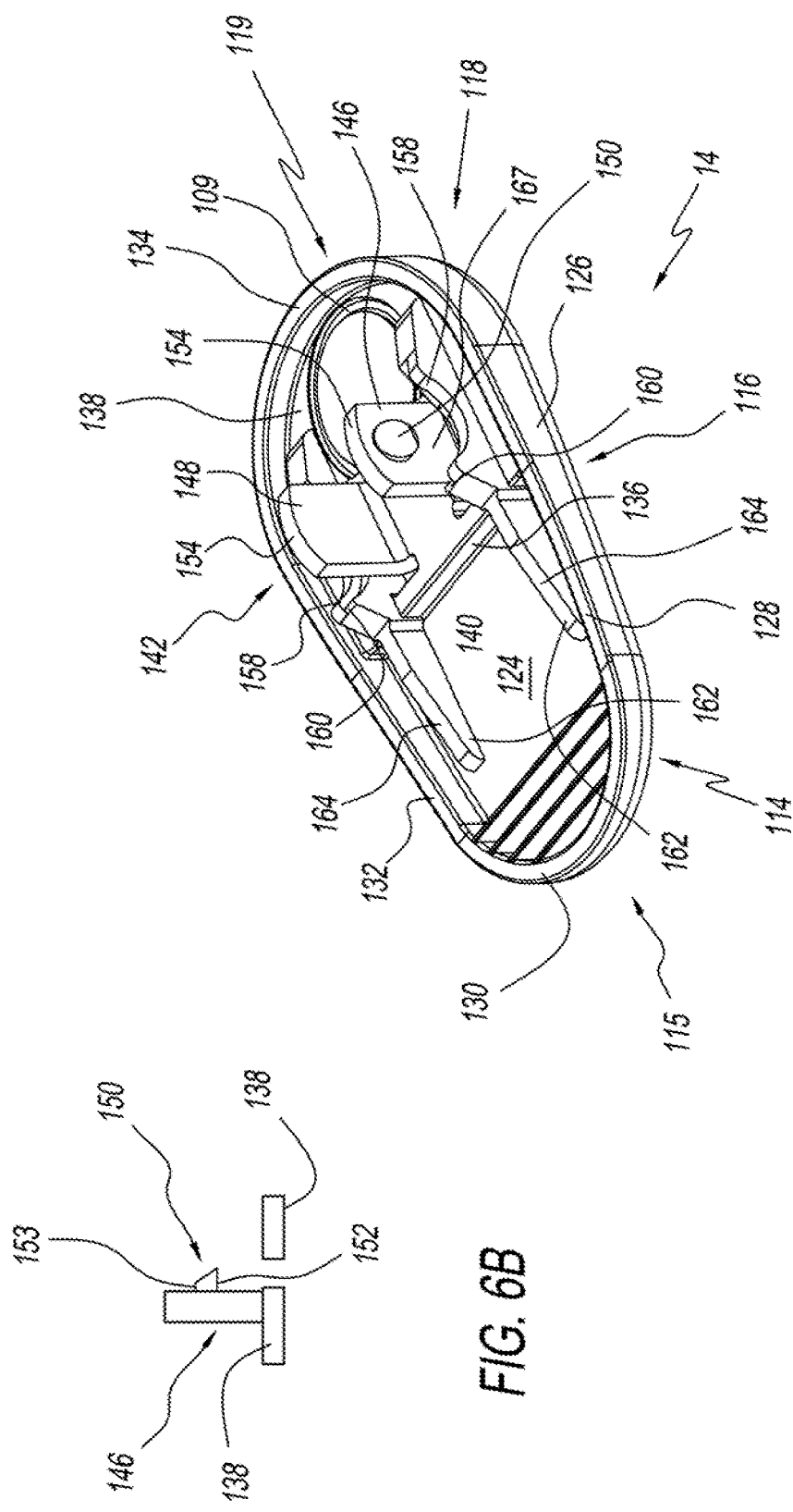
FIG. 6 is a perspective view of the second or bottom (or base) member of the present invention.
Figure 7:
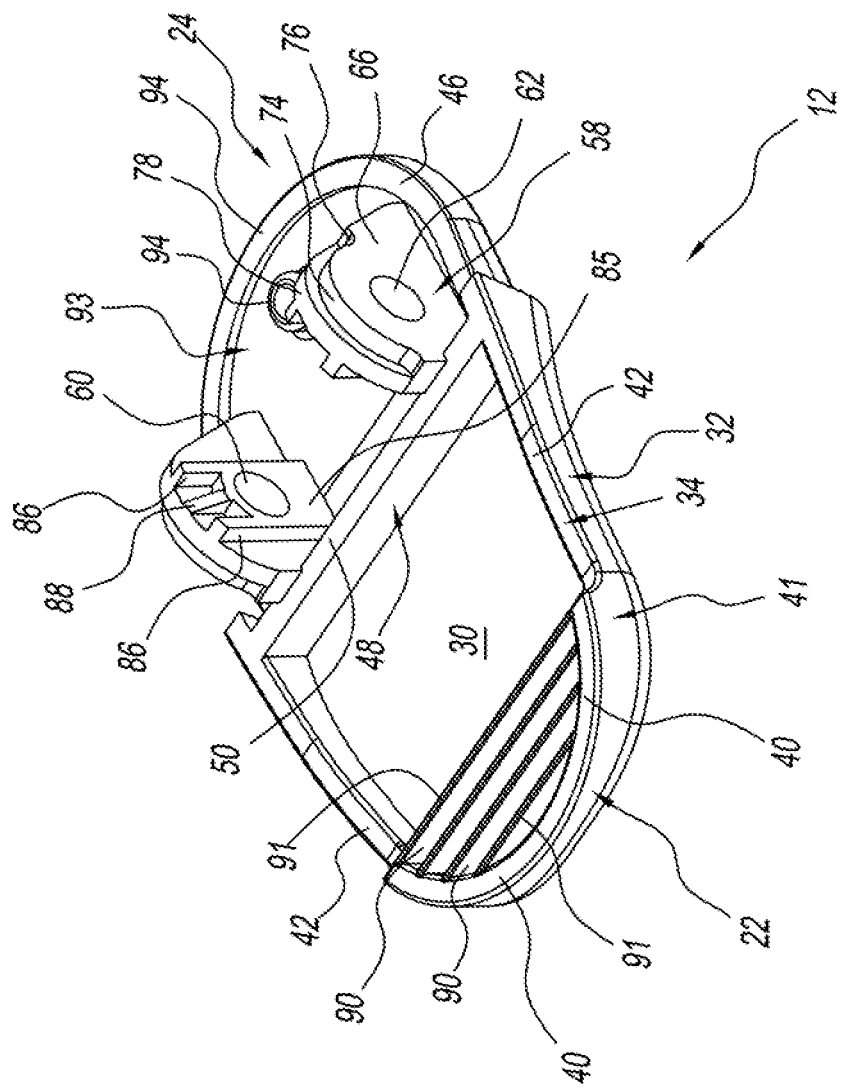
FIG. 7 is a perspective view of the underside of the top member of the present invention.

As best shown in FIGS. 1, 2 and 7, the upper body member 12 includes an exteriorly facing upper surface 26 and a lower interiorly facing surface 30 that may also be referred to herein as an underside surface 30. A perimetral flange-like skirt or lip 32 extends interiorly from the upper surface 26 and extends around the perimeter of the first or upper member 12 and extends in a plane generally perpendicular to the upper and lower surfaces 26, 30. The perimetral flange-like lip 32 includes a side portion 33 that terminates at an edge surface 36. Edge surface 36 includes a variety of different portions including a front portion 40 that is disposed at the forward end portion 41 of the upper body member 12. The front portion 40 is generally arcuate in configuration, to mate with the convexly arcuate forward end of the lower body member 14. The front portion 40 of the edge surface 36 serves as a primary component of the upper jaw 13.

The edge surface 36 also includes an arcuate rear portion 46 that is disposed at the rear end portion 47 of the upper member 12. A cross brace member 48 extends laterally between opposed portions of the perimetral lip 32, and conceptually separates the rear end portion 47 from the middle portion 51 of the upper member 12. The cross member 48 also includes an upper edge portion 50 that is generally at the same level as the middle portion 42 of the edge 36.

A pivot assembly 52 is disposed in the middle portion of the device, generally forwardly of the rear end portion 47. The pivot assembly 52 is provided for pivotably coupling the first member 12 to the second member 14.

The pivot assembly 52 includes first 56 and second 58 descending pivot base members. The first descending base member 56 includes a laterally opening, stud (pivot pin) receiving aperture 60, and the second descending pivot base 58 includes a second stud (pivot pin) receiving aperture 62.

Each of the descending pivot bases 56, 58 include an outer portion 66 that is disposed relatively laterally outwardly on the pivot base member 56, 58, a middle portion 68, and an inner portion 70. The inner portion 70 is disposed relatively laterally inwardly on the first and second pivot bases 56, 58 and the middle portion 68 is disposed in a lateral position between the outer and inner portion 66, 70.

The outer portion 66 includes an arcuately convex cradle edge surface 74 that, like edge 42, is positioned to face interiorly toward the second member 14, when the first and second body members 12, 14 are coupled together. The convex edge 74 is convexly shaped for receiving a concavely shaped mating part formed on the second member 14, that will be discussed below and that together comprise the strengthening member of the device 10. A stop member 76 is placed at the rearward end of the convex edge surface 74 to limit the movement of the corresponding concaved cradle edge surface of the second member 14.

The middle portion 68 includes a second convex cradle edge 78 that is provided for receiving a corresponding second concaved cradle edge that is formed from the second member 14. The inner portion 70 includes an upstanding reinforcing member 82 to provide additional structural rigidity and strength to the pivot bases 56, 58. The upstanding reinforcing member 62 includes a pair of guiding tracks 68 for interiorly capturing the pivot pin of the second body member 14, when the pivot pin and second body member 14 are moved into engagement with the first member 12.

An angled ramp member 18 is disposed between the two guiding tracks 86. The ramp member 18 helps to flex the pivot base members of the lower member 14 toward each other, so that the laterally extending pivot pin formed thereon, can move inwardly far enough so that it may easily slide into respective apertures 60, 62 of the respective first and second pivot bases 56, 58.

The forward portion 41 of the upper member 12 includes a plurality of parallel object-engaging cross members 90 that have an upper surface that is generally at, or above the level of edge 40. The cross members 90 provide an engaging surface for securely engaging any papers, potato chip bags or the like, that are being held between the jaws of the first and second members 12, 14.

The underside surface 93 of the rear portion of the top member 12 includes an upstanding post 94, that serves as a seat for receiving the first end 106 of spring 100. Spring 100 includes the first end 106 and a second end 108 that is received in a channel 109 formed in the inner surface 138 of the rear portion 118 of the base member 14. The channel 109 is generally circular in configuration, and is provided for receiving the relatively larger circular second end 108 of coil spring 100. The spring 100 is sized and configured to normally bias the top members 12 and bottom member 14 in a gripping position, wherein the front jaw-like portion 114 (jaws 13, 15) of the top 12 and bottom member 14 grippingly engage each other so that they will hold an object that is placed between the jaws, such as a piece of paper, photograph or top of a potato chip bag.

Figure 11:
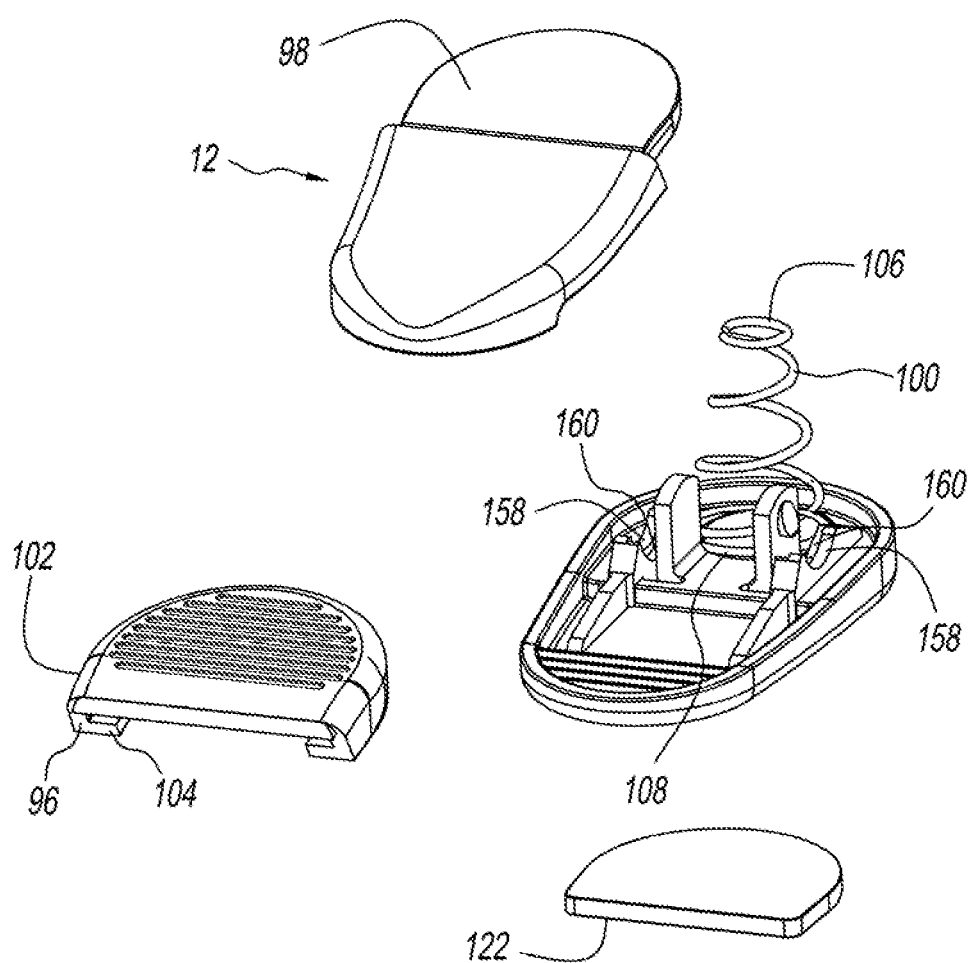
FIG. 11 is a front oriented exploded perspective view of the present invention.
Figure 12:
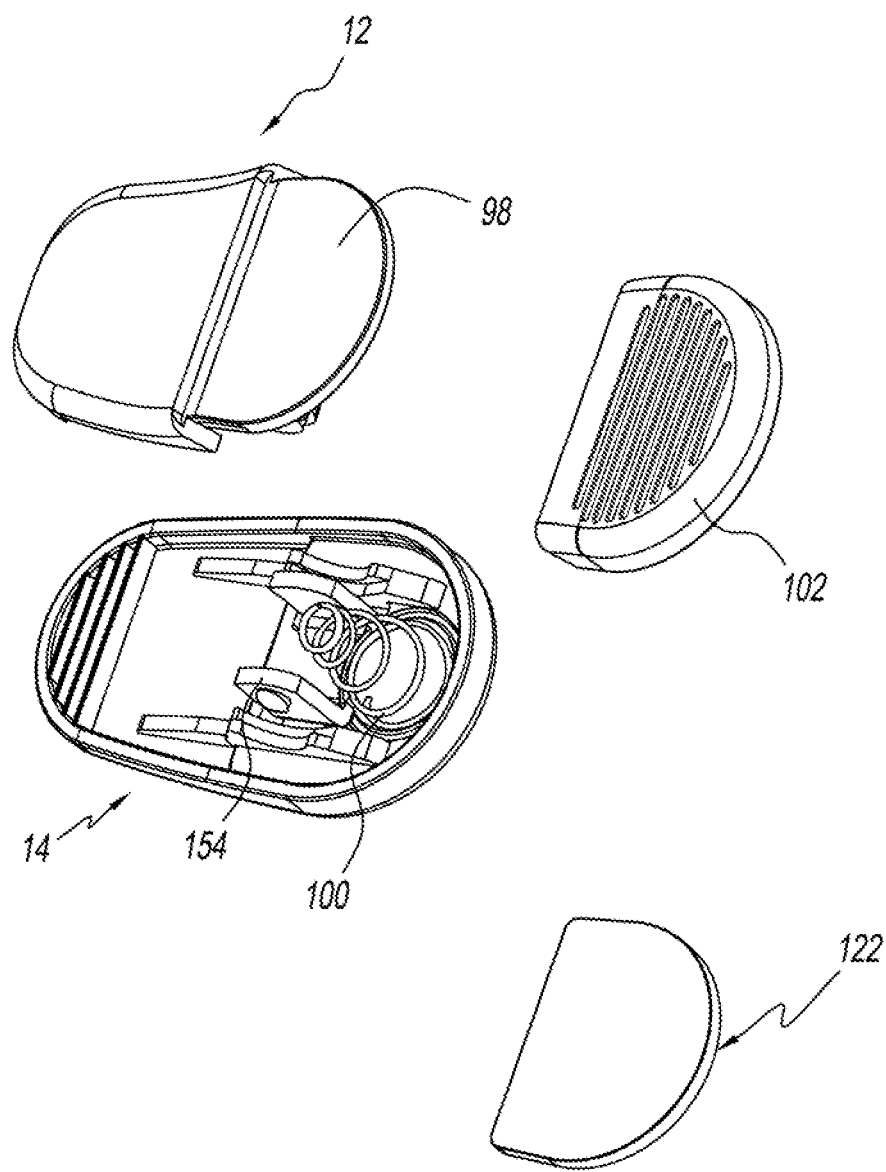
FIG. 12 is a top and left-hand oriented exploded perspective exploded view of the present invention.
Figure 13:
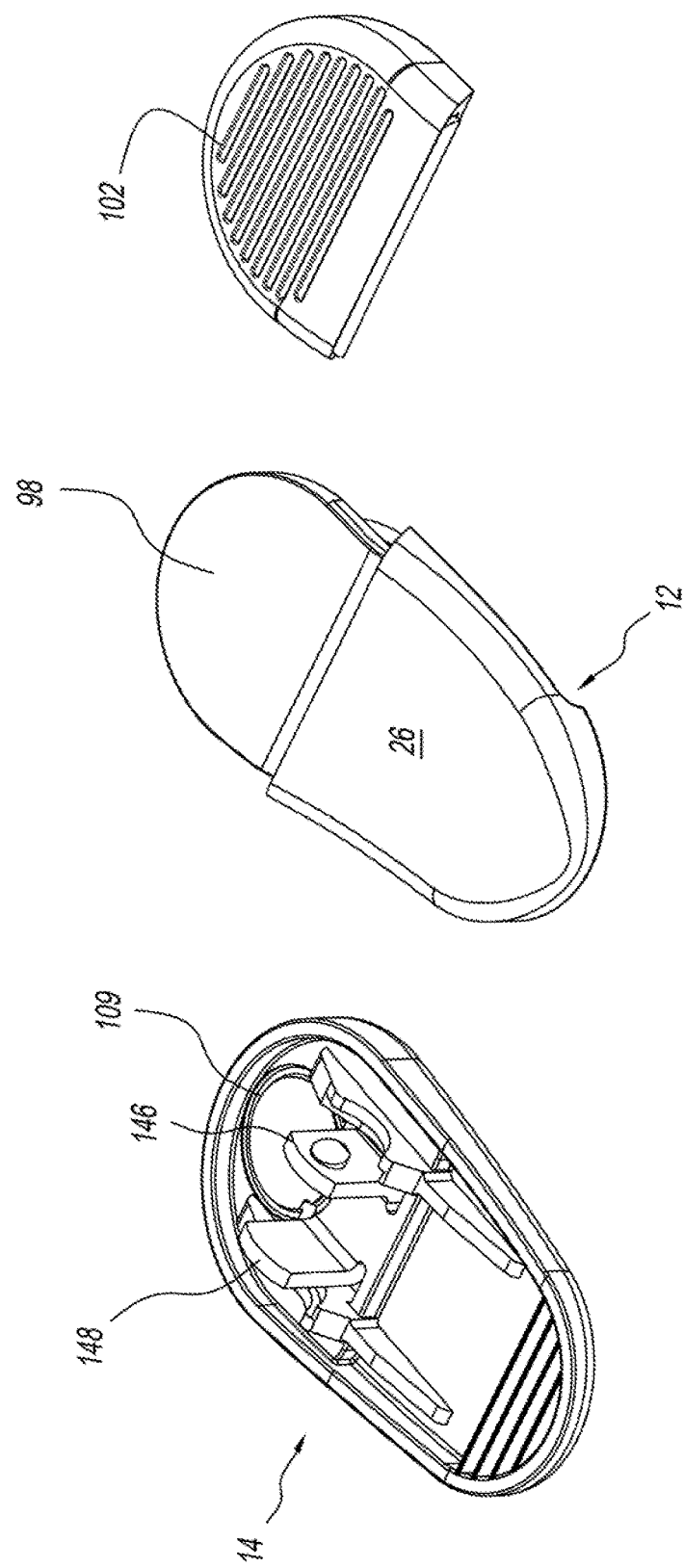
FIG. 13 is a front and top exploded perspective view of the present invention.
Figure 14:
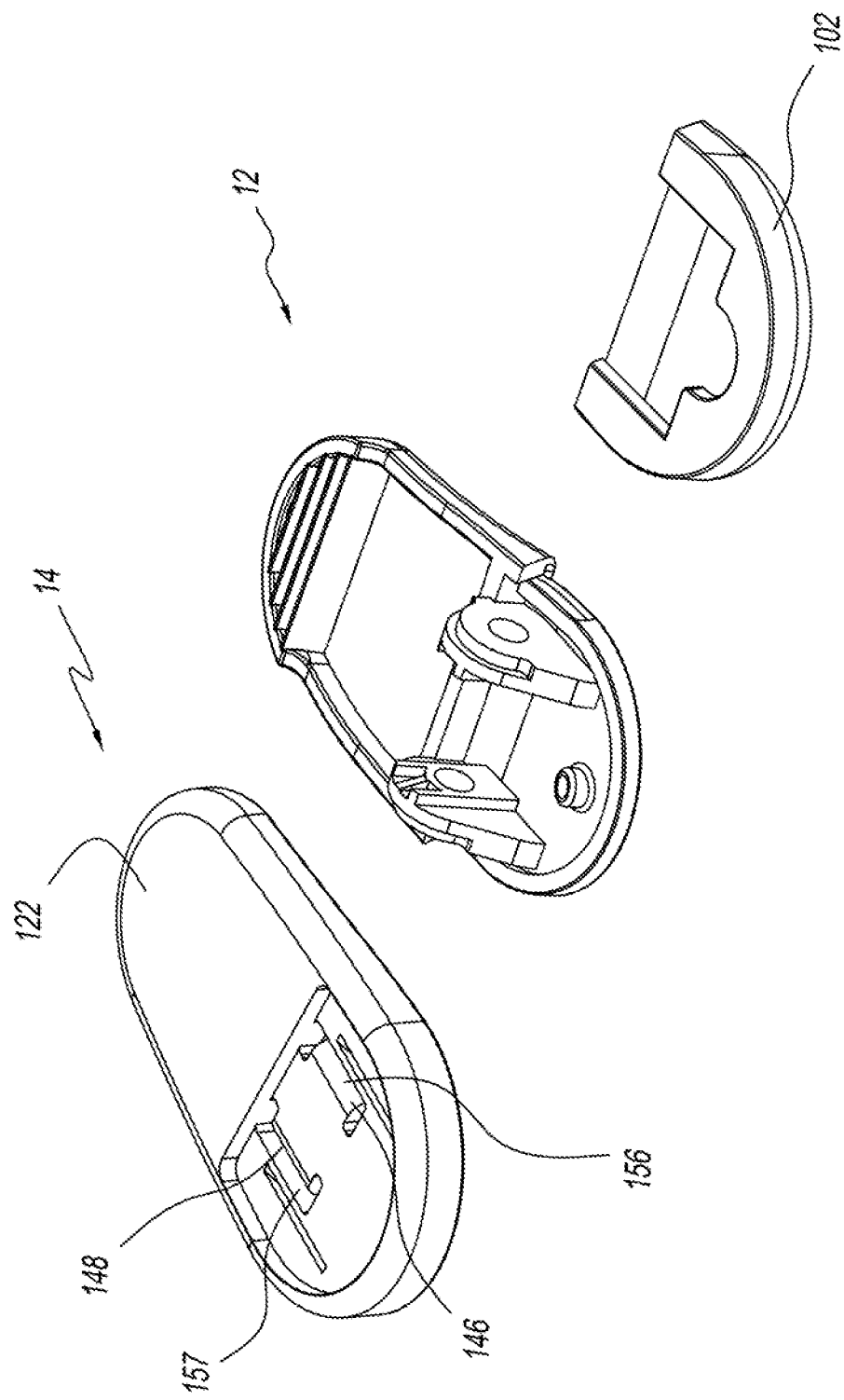
FIG. 14 is a bottom and rear-oriented exploded view of the present invention.
Figure 15A:
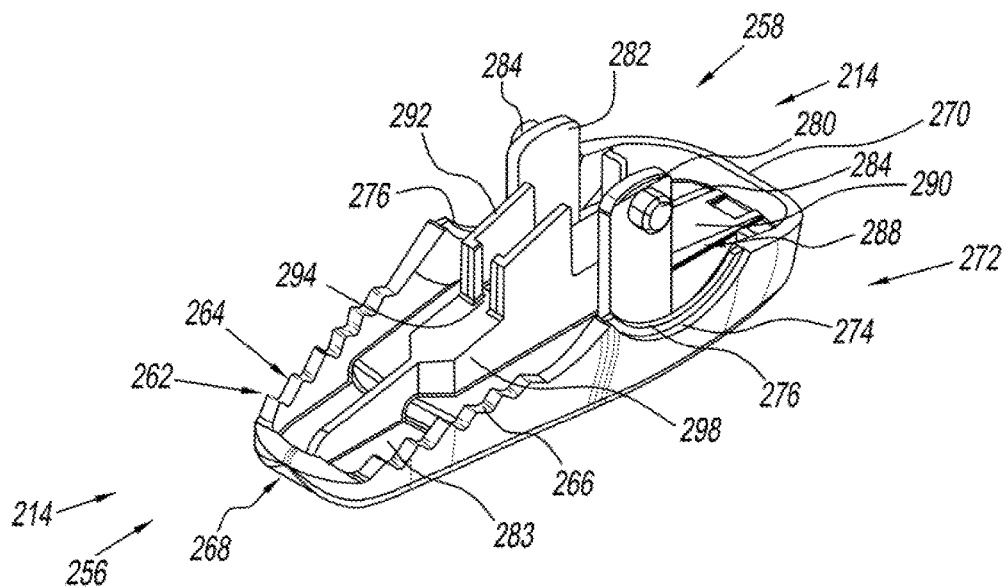
FIG. 15A is a top perspective view of the interior surface of the base member of a first alternate embodiment clip of the present invention.
Figure 15B:
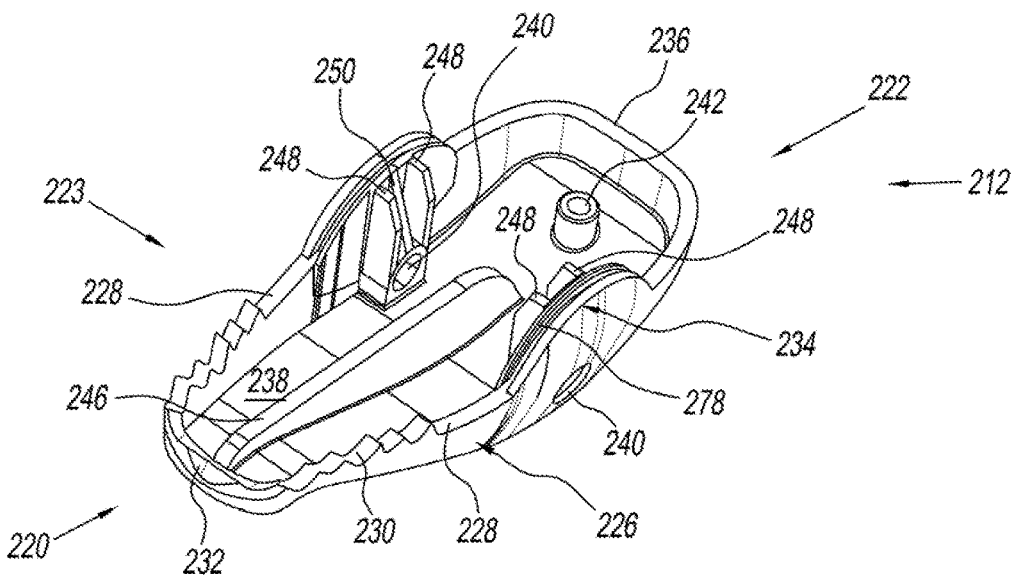
FIG. 15B is a perspective view of the interior surface of the upper member of the alternate embodiment shown in FIG. 15A.
Figure 15C:
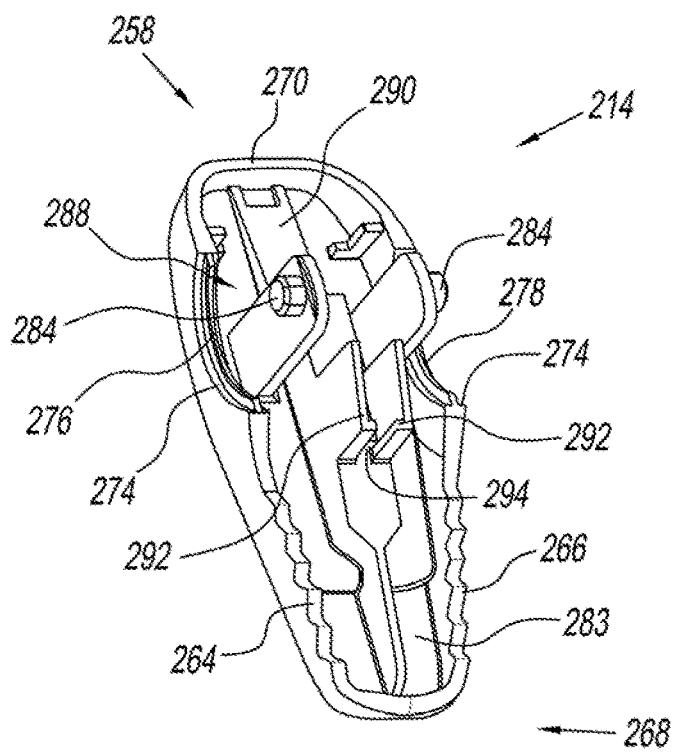
FIG. 15C is another top perspective view of the interior surface of the base member of the first alternate embodiment, taken from an angle different than the angle of FIG. 15A.
Figure 15D:
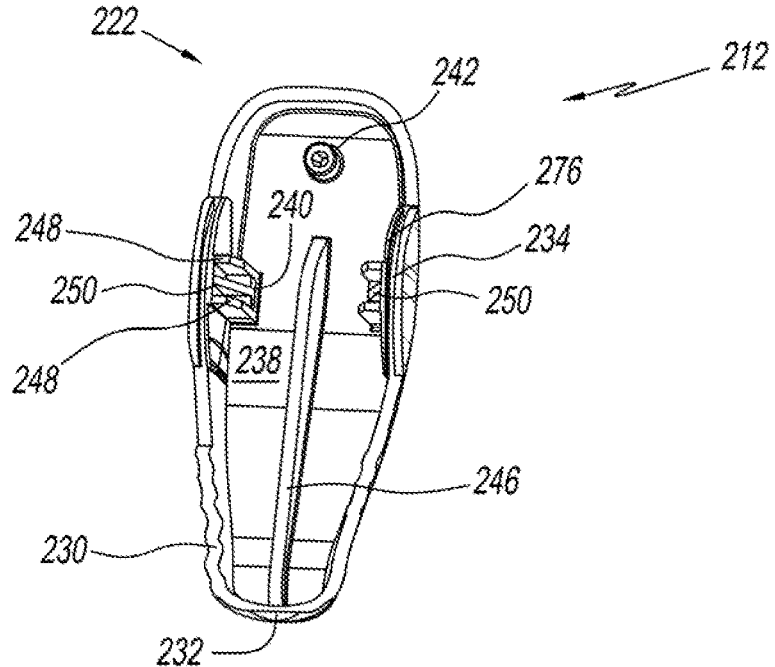
FIG. 15D is a perspective view of the interior surface of the upper member of the alternate embodiment shown in FIG. 15A.
Figure 15E:
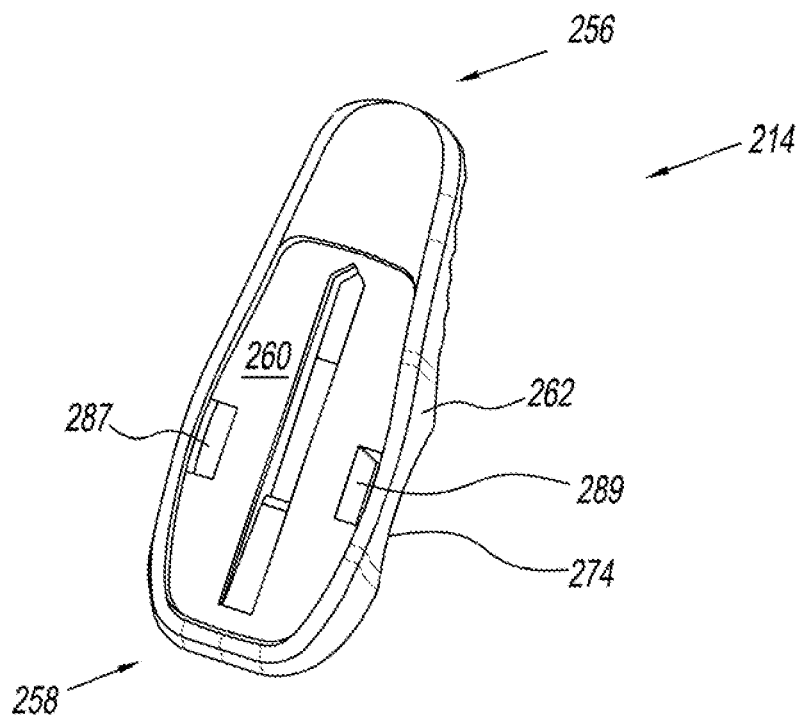
FIG. 15E is a perspective view of the exterior surface of the bottom member 214.
Figure 15F:
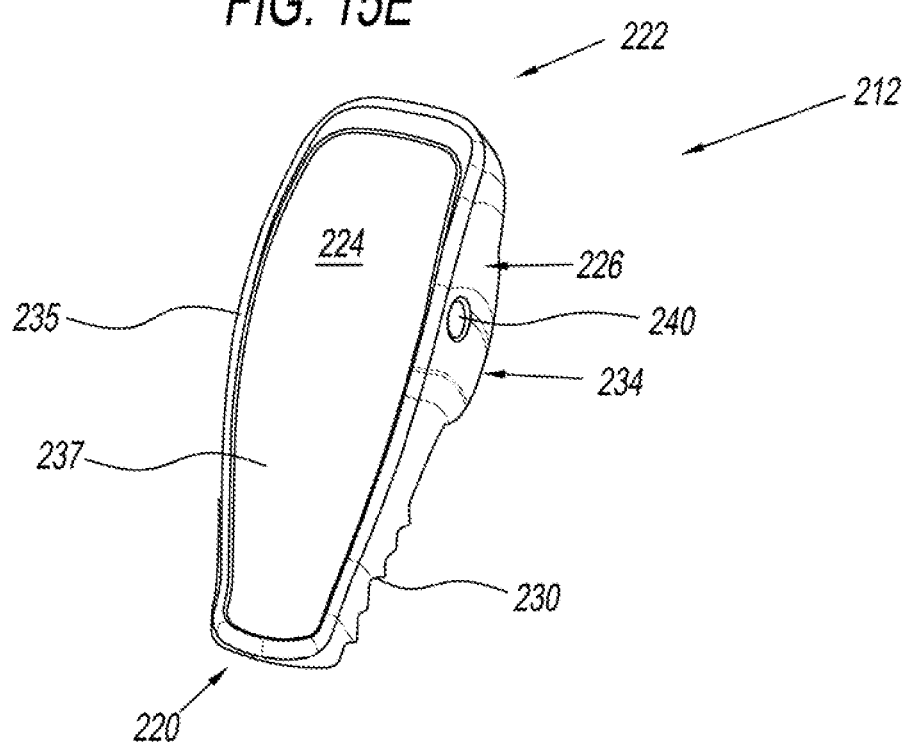
FIG. 15F is a perspective view of the exterior surface of the top member 212.
Figure 16:
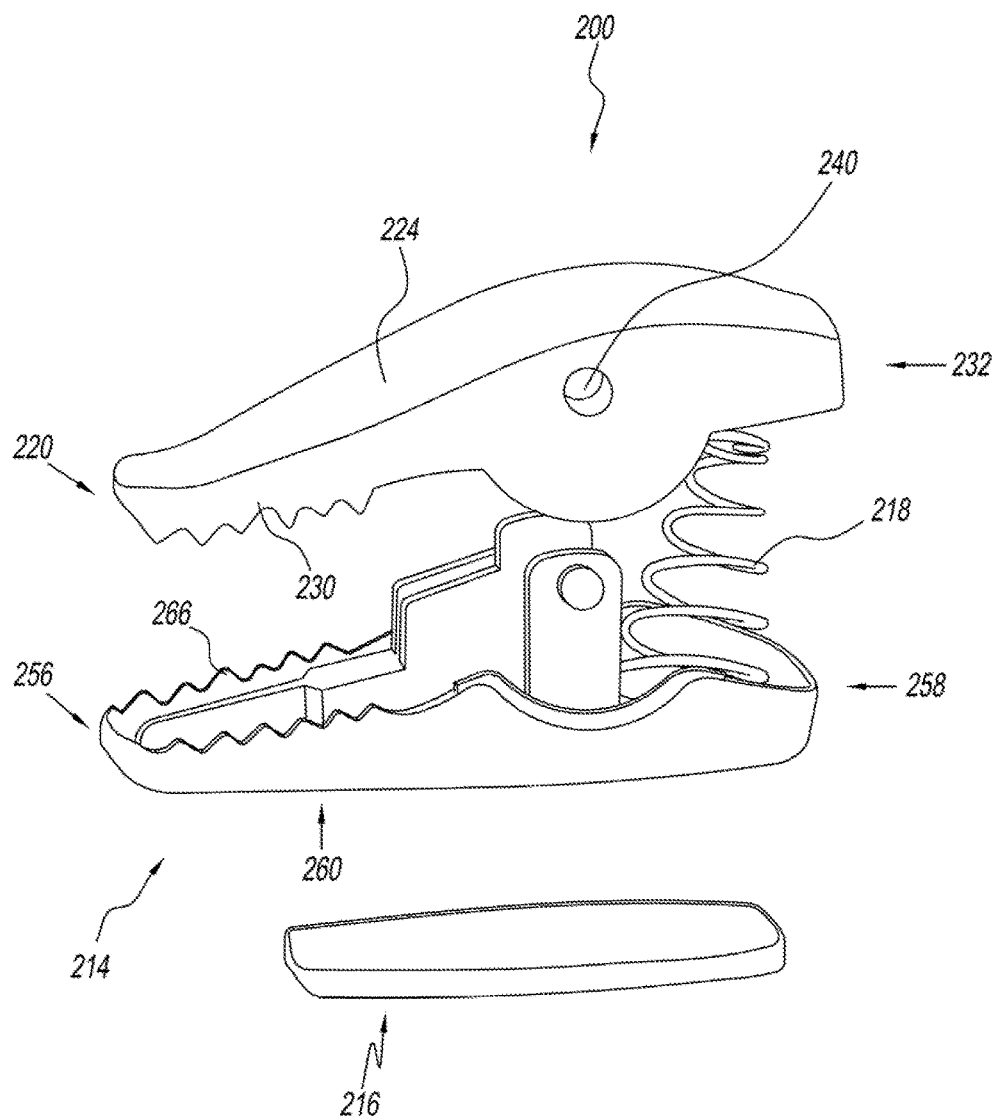
FIG. 16 is a side view of the first alternate embodiment of the magnetic clip of FIG. 16A-F of the present invention.
Figure 16A:
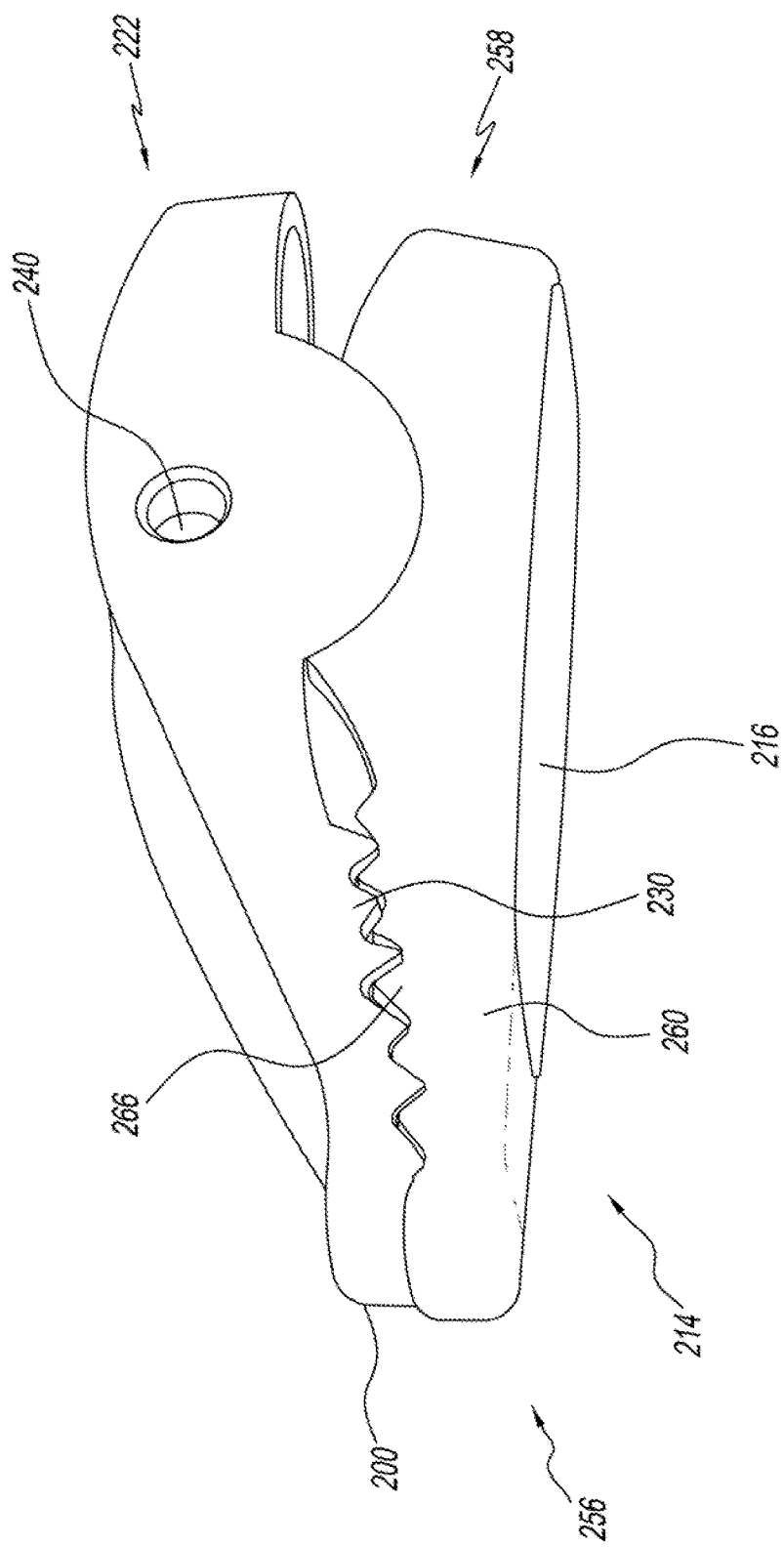
FIG. 16A is a side view of the first alternate embodiment magnetic clip of the present invention, showing the device in the assembled, and engaged position.

As best shown in FIG. 11, a gripping member 102 is provided for fitting over and frictionally engaging the reduced-size shelf 98 of the top member 12, that is disposed at the rear of the top member 12. The gripping member 102 is preferably made from a soft rubber-like material, such as a rubber material having a durometer hardness of about 40 Shore A. The gripping member includes a channel 104 for snugly and frictionally engaging the reduced sized rear end of the reduced sized rear shelf 98. The frictional engagement between the gripping member 102 and the rear shelf portion 98 is sufficiently great so as to enable the gripping member 102 to hold on to the rear shelf portion 98 without adhesives under most circumstances.

The second member 14 includes a forward portion 114 that includes a front end 115, a middle portion 116 and a rear portion 118 having a rear end 119. The front portion 114, the middle portion 116 and the rear portion 118 are placed in an opposed relationship to their respective front, rear and middle portions of the top member 12. The base member 14 also includes an exterior bottom surface 122 (see FIG. 9) and an inner surface 124, along with a perimetral flange-like skirt 126 that extends interiorly from the exterior bottom surface in a plane generally perpendicular to the plane of the exterior bottom surface 122.

The perimetral flange-like skirt 126 extends around the perimeter of the second (lower) member 14. The perimetral edge flange-like skirt 126 has a slightly lower height near the forward portion 114 of the device 10, when compared to the height of the skirt 126 at the rear portion 119 of the device. Nonetheless, the edge portion 128 of the perimetral flange-like skirt 126 is generally planar. The edge portion 128 includes an arcuate front edge portion 130, a generally linear middle side edge portion 132, and an arcuate rear edge portion 134.

A step portion 136 is provided on the middle portion of the inner surface 124, that serves as an arbitrarily designated line of demarcation between a relatively elevated rear surface portion 138 of the inner surface 124, and a relatively lower middle portion 140. A pivot assembly 142 is provided for engagement with the pivot assembly 52 of the top member 12. The pivot assembly 142 includes an upstanding first pivot receiving base member 146 and a second upstanding pivot receiving base member 148 that are disposed in a generally spaced, parallel plane relationship and extend upwardly from the rear portion surface 138.

Figure 8:
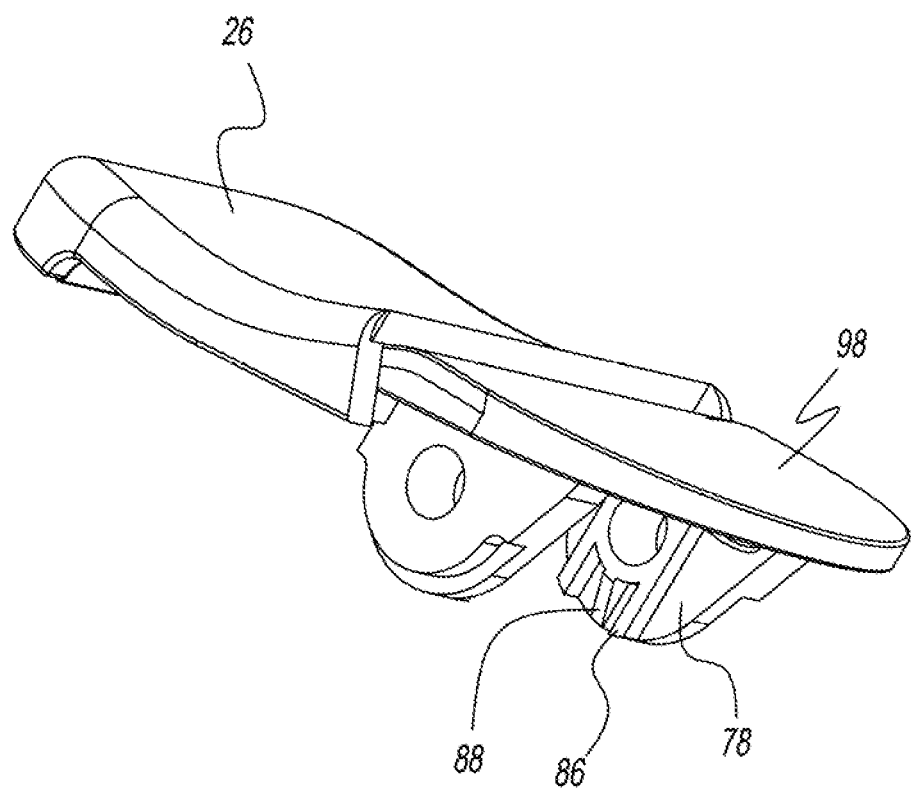
FIG. 8 is a side view of the top member of the magnetic clip of the present invention.

A laterally extending stud-like pivot pin 150 is formed on each of the first and second upstanding pivot receiving base members 146, 148 and is provided for being received by the pivot pin receiving apertures 60, 62 of the first (upper) body member 12. As best shown in FIG. 8, the laterally extending pivot pin 150 has an angled, laterally facing surface 149, that causes the pivot pin 150 to have a relatively shorter upper side surface 153, and a relatively larger or longer underside surface 152.

This relatively longer underside surface 152 helps to better engage the pivot pin 150 into the aperture, to keep the pivot assembly 142 of the lower member 14 pivotably engaged with the pivot assembly 52 of the top member 12. Additionally, the angled surface 149 of stud like pivot pin 150 provides for a smoother engagement between the pivot pin 150 and the corresponding aperture pivot pin receiving 60, 62 when the top and bottom body members 12, 14 are pressed together into engagement.

The pivot assembly 142 also includes arcuate upper edges to form an arcuate cradle surface 154 to provide a strengthening member for the pivot assembly, so that a force imposed on one or both of the first 12 and second 14 body members can be distributed across a larger area, to thereby reduce the strain imposed on the pivot assembly. This makes the clip 10 stronger to thus help to prevent the clip 10 from breaking when the clip 10 is either dropped on the ground, or one steps on the clip 10. The base members 146, 148 also include arcuate upper edges that help to provide clearance between the upper edges 154 of the pivot base members 146, 148, and the surface 93 of the top member 12.

The pivot assembly 142 includes a first arcuately concave cradle surface 158, and a second arcuately concave cradle surface 160. The first and second arcuately concave surfaces 158, 160 are provided for slidingly receiving the corresponding convex surfaces 74, 78 of the top body member 12 respectively. As such, any force that acts in a direction wherein the upper and lower body members 12, 14 are pushed together, will be absorbed over the relatively large area provided by the first and second concave cradle surfaces 158, 160 and the first and second convex cradle surfaces 74, 78.

Ramp members are also provided that extend in the middle portion. The ramp members include an angled ramping surface 164.

Figure 9:
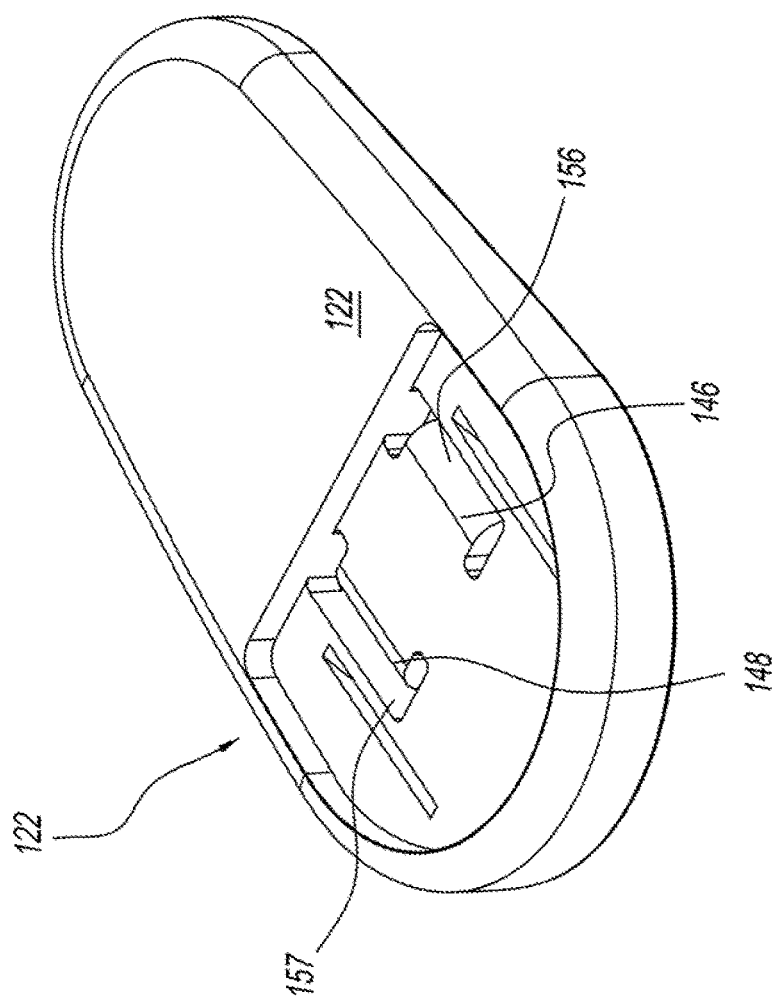
FIG. 9 is a perspective view of the underside of the base member of the present invention.

As best shown in FIG. 9, a pair of slots 156, 157 are formed to extend adjacent to the upstanding base member 146, 148 respectively. The slots 156, 157 serve a variety of purposes. One purpose served by the slots 156, 157 is to enable a finger of a mold to extend through the slots 156, 157 to thereby help to form the underside surface and lateral extent of the pivot stud 150. Without those slots 156, 157, forming the pivot stud 150 would be more difficult.

A second function served by the slots 156, 157 is that they help to enable the base members 146, 148 to have more "flexibility", so that the base members 146, 148 can bend in a direction toward and away from each other to a limited extent. This limited extent of bending is very useful when the device is assembled.

When the device 10 is assembled, the tolerances and dimensions of the device are designed such that the laterally outwardly facing surfaces 167 of the base members fit snugly against the laterally inwardly facing surfaces 85 of the reinforcing members 86. In order to enable the pivot member stud 150 to slide over the surface of the reinforcing member 86, there is some bend and give that is provided in the base members 146, 148 so that the pivot pin 150 can slide along ramp 88, that will cause the base members 146, 148 to bend inwardly, to a point wherein the stud 150 has moved far enough toward the top member 12, so that the pivot pin 150 can now engage apertures 60, 62. When the pivot pin 150 engages apertures 60, 62 the base members 146, 148 spring laterally outwardly, because they are permitted to do so because the pivot pin 150 is allowed to move laterally outwardly through the apertures 60, 62.

Figure 10:
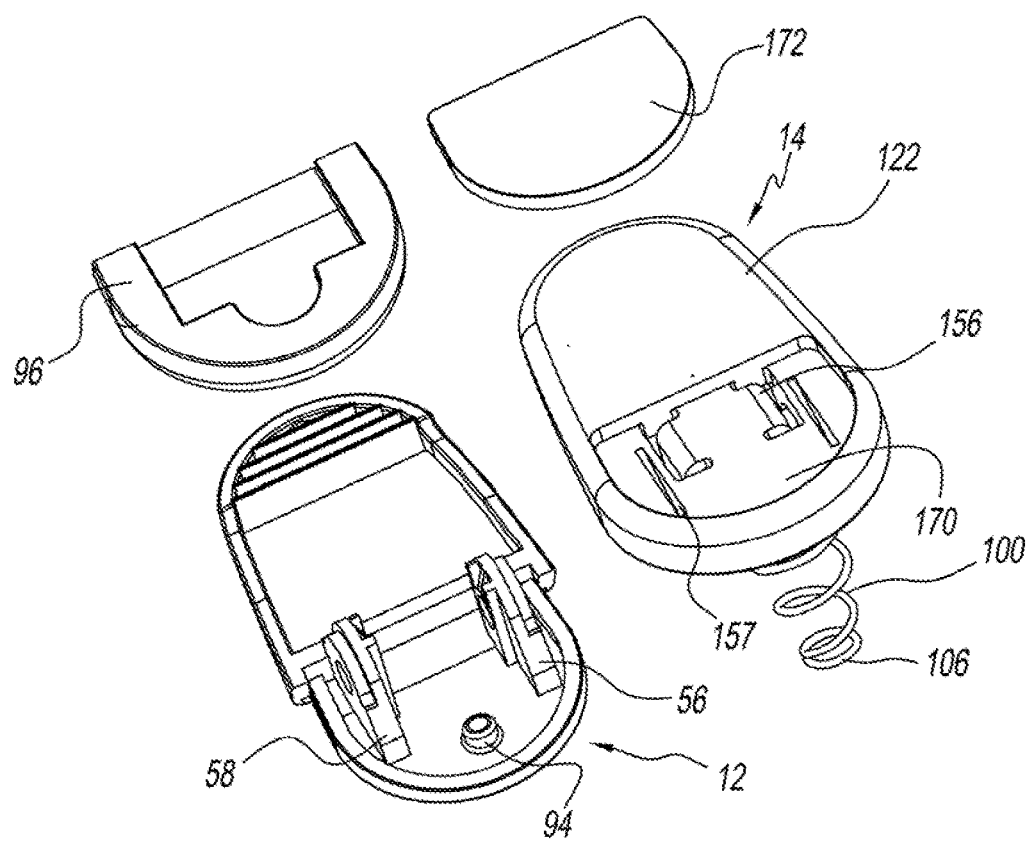
FIG. 10 is a bottom oriented exploded perspective exploded view of the present invention.

As best shown in FIG. 10, the apertures 156, 157 are formed in a recessed area 170 of the base surface 122 of the lower body member 14. A sheet-like magnet member 172 is provided that fits into the recessed portion 170, to cover over the opening of the slots 156, 157. The magnet member 172 is preferably glued or otherwise adhesively attached to the recessed surface 170 so that the magnet 172 adhesively adheres to the exterior surface of the lower body member 14. The magnet 172 enables the clip 10 to be magnetically attached to a magnetizable surface, such as a refrigerator door or file cabinet.

A first alternate embodiment clip having a cradle-like pivot assembly 200 is shown in FIGS. 15A-16A. The reptile head-shaped magnetic clip 200 includes a top upper body member 212 that is pivotably coupled to a lower second member 214. A magnetic sheet 216 is adhesively coupled to the underside exterior surface of the lower body member 214 to enable the clip 200 to magnetically adhere to a magnetizable surface, such as a refrigerator door, metal desk top or the like. A biasing member such as spring 218 extends between the interior surfaces of the rear portions 222, 258 of the first body member 212 and the second body member 214 to normally bias the first 212 and second 214 body members about their pivot in a position wherein the jaws at the front 220, 256 of the first and second body members 212, 214 engage, and the rear portions 222, 258 of the first 212 and second 214 body members are spatially separated.

When so engaged, the teeth 230 of the first member 212 and the teeth 266 of the second body member 214 will inter-engage, to provide a secure gripping surface for objects, such as papers, potato chip bags, pretzel bags, photographs and the like that are grabbed securely between the jaws at the front portions 220, 256 of the magnetic clip 200. It should be noted that the clip 200 is referred to as a magnetic clip not because the first body member 212 is magnetically attracted to the second body member 214, but rather because the clip 200 can be magnetically coupled to a metal member by the magnet 216. Clip 200 will function well as a clip without the magnet 216, although it will lose its ability to magnetically couple to a magnetizable surface.

The first body member 212 includes a front end 220 and a rear end 222, an exterior top surface 224 and an interior surface. Extending interiorly from the top surface 224 and extending around the perimeter around the exterior top surface 224 is a perimetral skirt (lip) 226 that extends in a plane generally perpendicular to the plane of the external top surface 224 in a flange-like manner. The perimetral skirt 226 terminates at an interiorly facing edge portion 228 that faces toward the second body member 214.

The edge portion 228 includes a middle portion that comprises a plurality of teeth 230 that are inter-engageable and matable with corresponding teeth 226 that are formed in the edge portion of the second body member 214. The edge portion 228 further includes a generally squared-off arcuate frontal portion 232 that has the same general appearance and configuration as the forward portion of the jaw of an alligator or crocodile type reptile. The edge portion 228 also includes a relatively squared-off rear portion 236 having rounded corners.

The middle portion 223 also includes a portion of the pivot assembly 231, in particular, that portion of the pivot assembly that comprises an arcuately convex cradle portions 234. The convex cradle portion 234 is generally convexly arcuate, and includes a longitudinally extending central trench 278 for receiving a centrally disposed rail (ridge) 276 that is formed on the edge portion of the concave portion 274, 276 of bottom member 214. The convex cradle portion 234 is designed for matably and slidably receiving the concave cradle portions 274, 276 of the bottom member 214. An upstanding post 242 extends upwardly from the interior surface 238 of the first body member 212, and provides a seat for one end of the biasing member spring 218.

A longitudinally extending and centrally disposed spine-like alignment rail 246 extends centrally along the interior surface 238 of the first body member 212. The longitudinal alignment rail 246 is designed for being received in the central slot 294 of the guide box 292 that is formed on and extends upwardly from the interior surface 283 of the second body member 214. The longitudinal alignment rail 246 is centrally disposed.

A pair of guide rails 248 extend generally perpendicular to longitudinal alignment rail 246, and are formed on the interior surface of the convex cradle portions 234. The guide rails 248 are generally spaced apart by a distance such that they can interiorly receive stud-like pivot pins 284 that are formed on the pivot assembly base members 280, 282. A ramp member 250 having a beveled surface extends between and generally parallel with the guide rails 248, and is provided for inwardly urging the pivot assembly base members 280, 282 so that the pivot pin 284 can move inwardly far enough to engage the pivot pin receiving aperture 240 formed in the convex cradle portions 234. The engagement of the pivot pins 284 and the pivot pin receiving apertures 240 pivotably couple the second body member 214 to the first body member 212.

The exterior surface 224 includes a perimetral lip 235 that forms a frame of a relatively recessed label or decal receiving area 237. The label receiving area 237 is provided for receiving a decal or label, or printing for providing a message, decoration, pictures or advertising copy.

The second body member 214 includes a front end 256 and a rear end 258, along with an exterior bottom surface 260. A perimetral lip or skirt 262 extends around the exterior bottom surface 260 in a plane generally perpendicular to the plane of the exterior bottom surface 260.

First 287 and second 289 apertures are formed in the exterior surface 260 to extend completely through the body member 214. Mold fingers can extend through the first 287 and second 289 apertures to form the interior side surfaces of the first 280 and second 282 pivot base members, and the underside half of the pivot pins 284. Without the apertures 287, 289, forming the pivot pins 284 would be significantly more difficult. The perimetral skirt 262 includes an edge portion having a middle portion 266 that includes a plurality of teeth 266 that are matable and inter-engageable with the teeth 230 of the top member 212. The middle portion 266 also includes an arcuate forward portion 268 and a generally squared off arcuate rear portion 270. The arcuate forward and rear portions 268, 267 have dimensions that are generally similar to the corresponding parts of the top member 212.

A pivot assembly 272 includes an arcuately concave cradle portion 274 that has a shape, size and configuration to mate with the arcuately convex cradle portion 234 of the top member 212 and thereby form a strengthening member for the clip. The concave cradle portion 274 also includes a central ridge 276 that is sized, positioned and configured for being slidably received into the central trench 278 of the upper body member 212.

A first pivot base member 280 and second pivot base member 282 are disposed in parallel planes and extend generally upwardly from the interior surface 283 of the second body member 214. Each of the first and second base members 282, 284 include a laterally extending pivot pin stud 284 that is sized and positioned for being received in the pivot pin receiving apertures 240 of the top body member 212. The apertures 240 are positioned at the same position at which the "eyes" of the crocodile are positioned on a crocodile. When the stud like pivot pins 284 extend through the apertures 240, the distal ends of the pins 284 still remain somewhat recessed, so that it appears that the reptile has visible eye sockets. The pins 284 serve as pivot pins about which top body member 212 pivots relative to the bottom body member 214.

A longitudinal spine 288 extends upwardly from, and longitudinally along the interior surface 283 of the second body member 214. The longitudinal spine 288 includes a rear portion having a flattened upper surface 290 that serves as a spring seat for receiving the spring 218. The longitudinal spine 288 also includes an upstanding guide box 292 having a central slot 242 and a hollow interior for capturing the longitudinal spine member 246 of the top body member 212, for helping to maintain the lateral alignment between the upper 212 and lower 214 body members.

A ridge-engaging surface 298 is formed forwardly of the guide box 292 and is provided for engaging the ridge engaging surface 299 of ridge 246. When the ridge engaging surface 298 engages the ridge 246, the contact between the two helps to prevent the first and second body members 212, 214 from shattering or otherwise breaking under a compressive loading force, if for example, they are stepped on.

A second alternate embodiment clip 300 of the present invention is shown in FIGS. 17-24. The second embodiment clip 300 also has a generally reptilian shape, although it has a more blunted off front end, than the more rounded front end shown in the first alternate embodiment 200.

Figure 17:
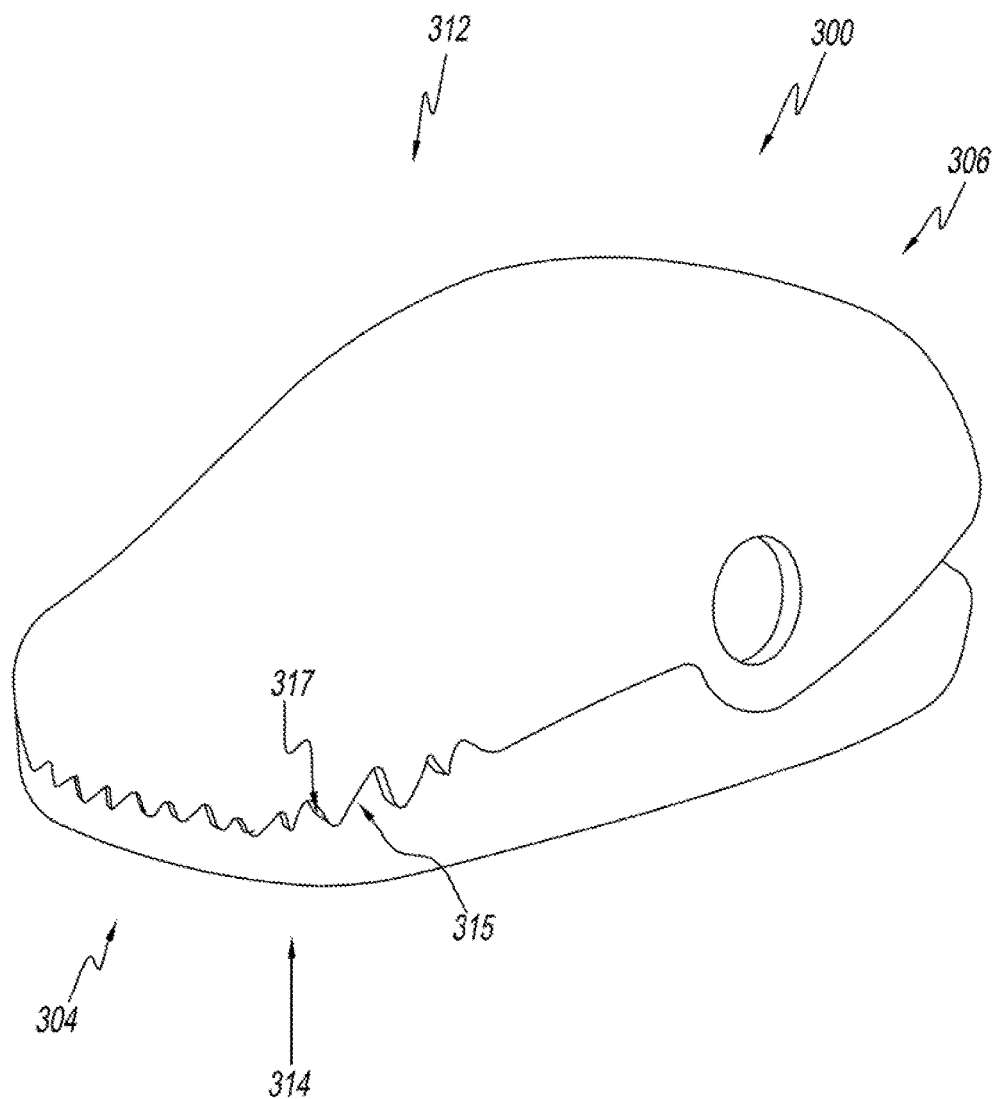
FIG. 17 is an assembled, perspective, frontal view of a second alternate embodiment of the present invention.
Figure 18:
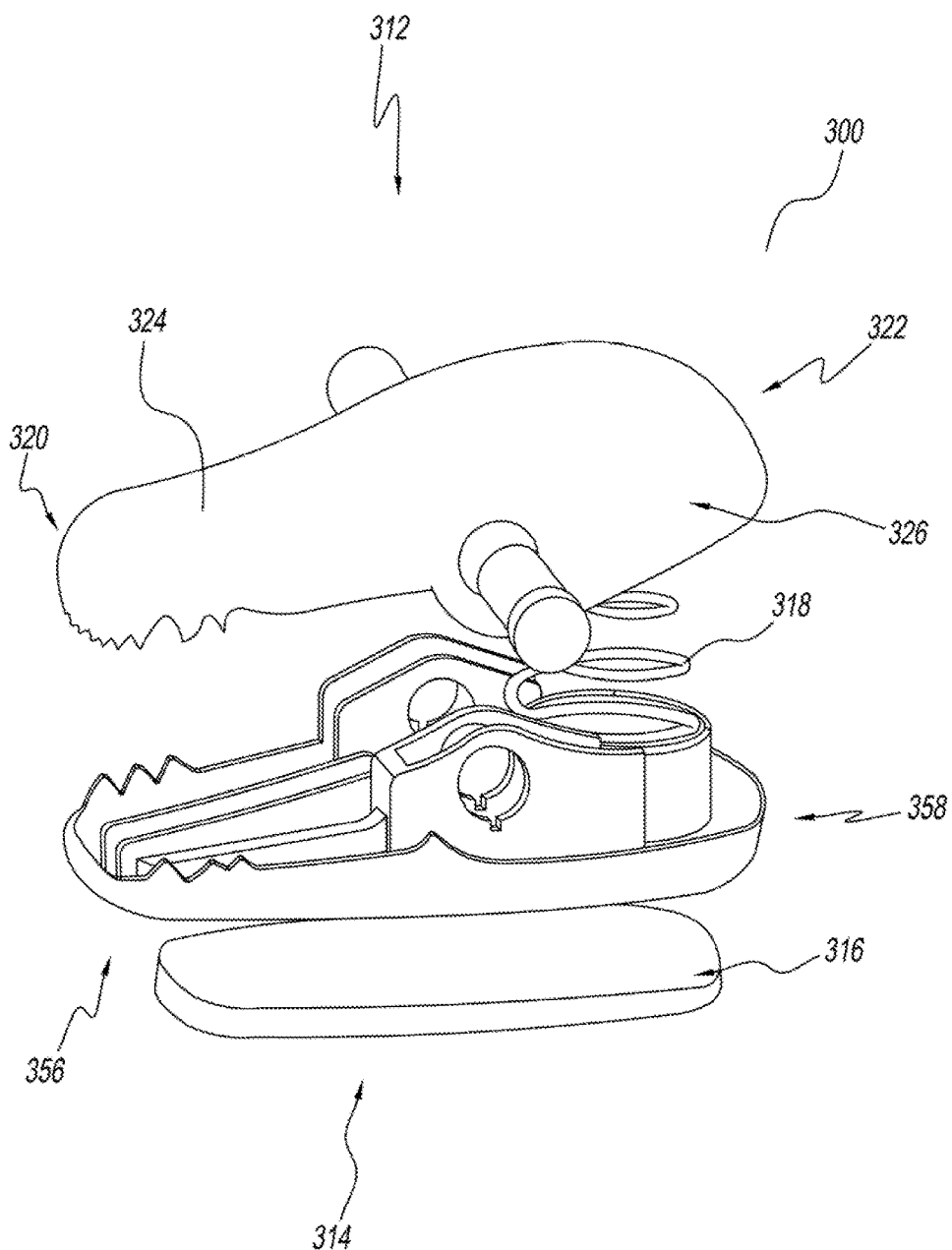
FIG. 18 is an exploded view of the second alternate embodiment shown in FIG. 17.
Figure 19:
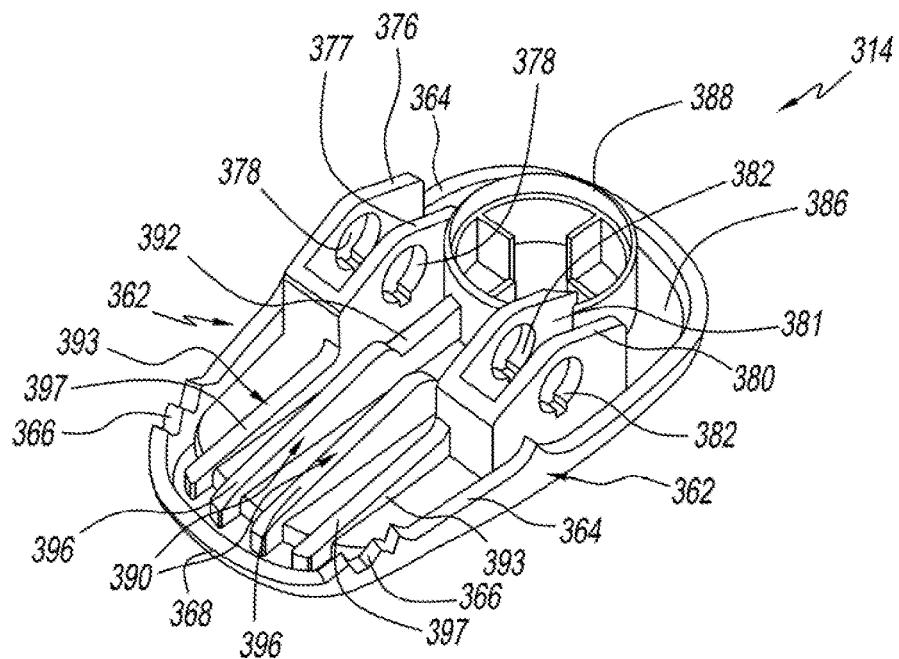
FIG. 19 is a perspective view of an interior of the bottom member of the second alternate embodiment.
Figure 20:
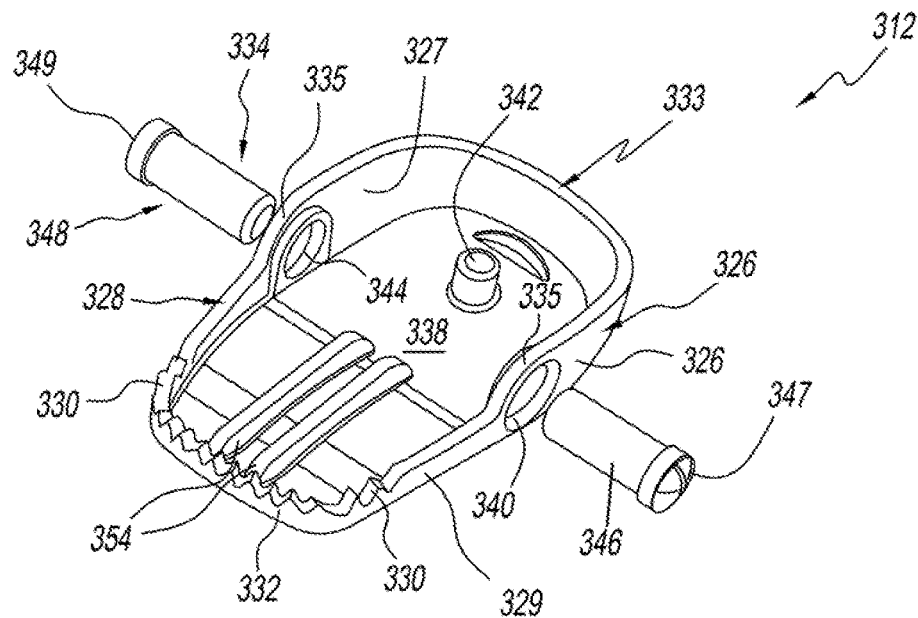
FIG. 20 is a perspective view of the interior of the top member of the second alternate embodiment.
Figure 21:
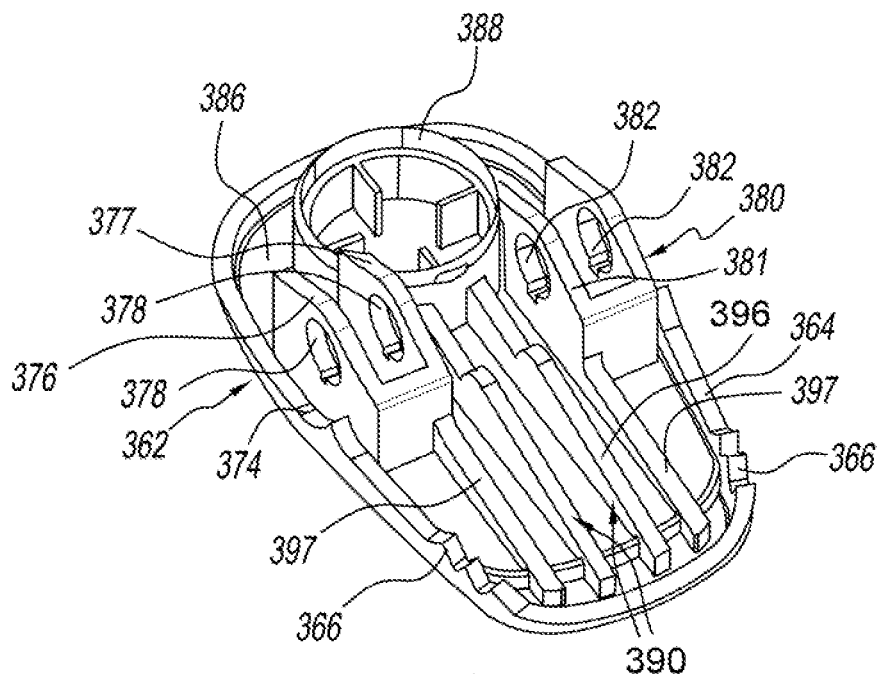
FIG. 21 is a perspective view of the interior of the bottom member of the second alternate embodiment, taken from a different perspective than the one of FIG. 20.
Figure 22:
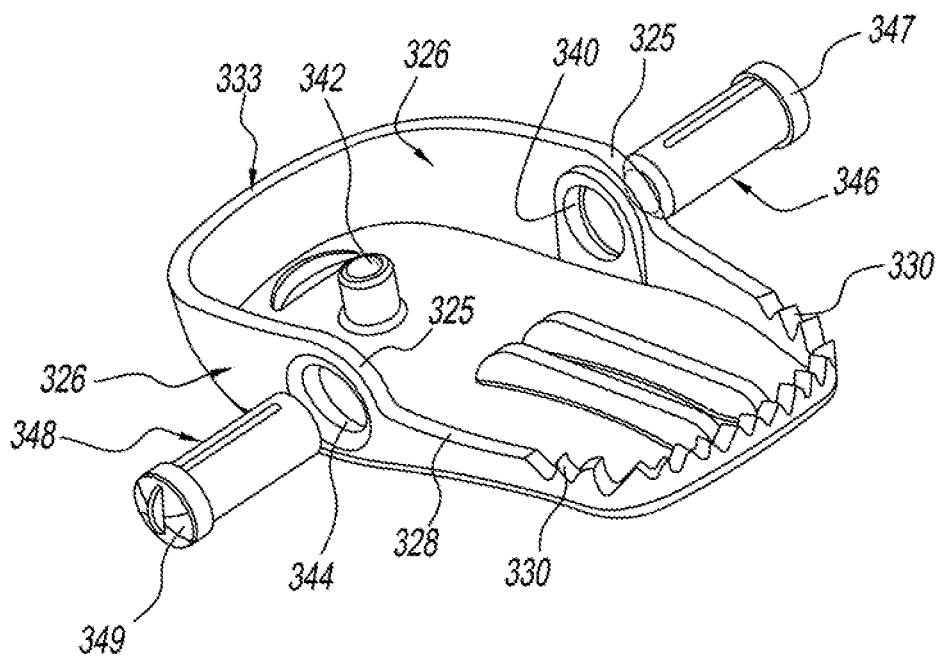
FIG. 22 is a perspective, partly exploded view of the interior of the top member of the second alternate embodiment.
Figure 23:
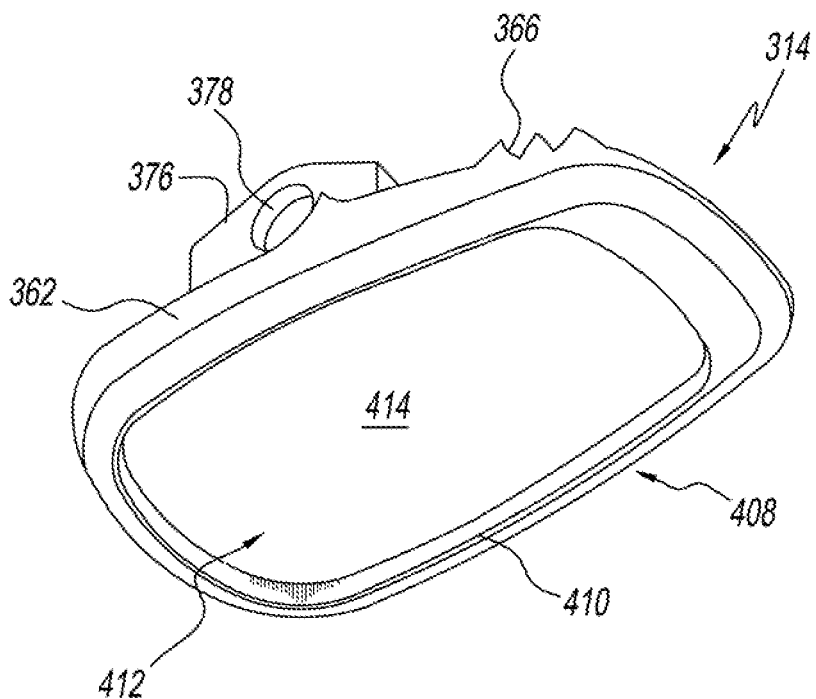
FIG. 23 is a perspective view of the exterior (bottom) surface of the bottom member of the second alternate embodiment.
Figure 24:
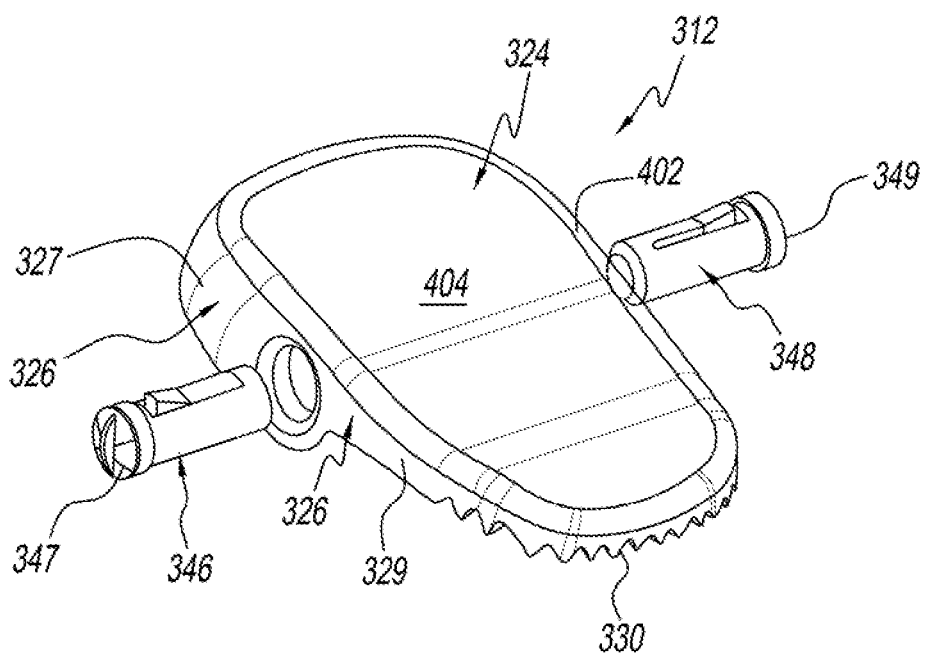
FIG. 24 is a perspective view of an exterior top surface of the top member of the second alternate embodiment.

The second alternate embodiment clip 300 includes a top or first body member 312 and a bottom or second body member 314 that are pivotably coupled to each other to move between an item engaging position, such as is shown in FIG. 17, wherein the front jaws 315, 317 at the front end 304 are engaged and the back end 306 is separated; and an item release position wherein the back end portion 306 of the bottom body member 314 and top body member 312 are engaged and/or are disposed relatively nearer to each other and the front jaws 315, 317 are relatively spatially separated from each other.

A magnetic sheet 316 is coupled on to the underside surface 313 of the bottom body member 314 for enabling the device 300 to be magnetically coupled to a magnetizable surface such as a refrigerator door.

A spring 318 extends between the interior surface of the portion of the top body member 312 and interior surface of the rear portion of the bottom body member 314. The spring 318 normally biases the top and bottom body members 312, 314 into the jaw 315, 317 engaged position. The top member body 312 includes a front end 320 and a rear end 322 along with an exterior top surface 324. The top body member 312 also includes a perimetral skirt 326 that extends downwardly in a flange-like manner, in a plane that is generally perpendicular to the plane of the exterior top surface 324.

The perimetral skirt 326 includes a relatively enlarged rear portion 327, that forms a part of the pivot assembly; and a relatively smaller reduced frontal portion 329. The perimetral skirt 326 terminates in an edge portion 328 that includes a frontal portion that includes a plurality of teeth 330. The teeth 330 of the middle portion are provided for facilitating engagement of the papers or other items held by the clip 310.

The edge portion 328 also includes a squared off, arcuate front portion 322, and a squared off, arcuate rear portion 333. A pivot assembly 334 is provided that can be coupled to a pivot assembly of the bottom body member 314 to pivotably couple the top body member 312 and bottom body member 314 together, so that they can pivot between the engaged and release positions as described above. The pivot assembly 334 of the top member 312 includes a convex cradle portion 335 that is part of the edge portion 328 of the perimetral skirt 326.

The top body member 312 also includes an interior surface 338 upon which is formed a post 342 at the rearward portion for serving as a seat and holder for the upper end of spring 318. A pair of apertures 341, 344 are formed in the relatively enlarged rear portion 327 of the perimetral skirt 326. The apertures 341, 344 are aligned, and are sized and configured for receiving stud-like pivot pins 346, 348 therein. The pivot pins 346, 348 include enlarged heads 347, 349 respectively, that have a diameter that is too large to permit the pivot pins 346, 348 to fit through the apertures 341, 344, so that the heads 347, 349 of the pivot pins 346, 348 remain disposed exteriorly of the apertures 341, 344, to thereby help to fixedly couple the top body member 312 to the bottom body member 314, along with serving as pivot pins.

A pair of longitudinally extending gripping spines 354 are disposed interiorly and extending upwardly from the underside surface 338 of the top body member 312. The longitudinal gripping spines 354 cooperate with the teeth 330 to help hold the object held by the clip in place on the clip 310.

The bottom body member 314 includes a front end 356 and a rear end 358 that are generally sized, configured and positioned to align with the respective front and rear ends of the top body member 312. The bottom body member 314 includes an exterior bottom surface 360 that includes a recessed portion for receiving the magnetic sheet 316 therein. The magnetic sheet 316 is adhesively attached to the dished out area 404 of the exterior bottom surface 360 of the bottom body member 314. A perimetral skirt 362 extends around the perimeter of the exterior bottom surface 360 and extends in a plane generally perpendicular thereto. The perimetral skirt 360 includes an edge portion 364 having a middle portion 366, a squared off, arcuate front portion 368 and a squared off arcuate rear portion 370.

The middle portion comprises a set of teeth 366 that are sized and configured for inter-engaging the teeth 330 of the top body member 312. Teeth 330, 366 are provided for cooperatively gripping an object, such as a paper piece held or the opened flaps of a pretzel bag (not shown) by the gripping device 300.

A pivot assembly 372 is provided for helping to cooperate with the pivot assembly of the upper body member 312 for pivotably coupling the top and bottom body members 312, 314 to each other. The pivot assembly 372 includes a concave cradle portion 374 that is sized and positioned and configured for receiving the convex cradle member 335 of the top body member 312.

First pivot receiving base (support) member set 376, 377 and second pivot receiving base member set 380,384 extend upwardly from the interior surface 386. The first pivot receiving base member set 376, 377 includes a first aperture set 378 that is aligned with the second aperture set 382 that is formed in the second pivot receiving base member set 380, 381. The first pivot pin 346 is provided for extending through the aperture 340 of the top body member 312 and being received by the first aperture set 378 of the first pivot receiving base member 376.

Similarly, the second pivot member 348 is designed for being received within the second aperture 341 of the top body member 312, and the second aperture set 382 of the second pivot receiving base member set 380,381. Through this engagement of the pivot pins 346, 348, apertures 340, 341 of the top body member 312 and the first and second apertures 378, 382 of the bottom body member 314, the first and second body members 312, 314 are fixedly coupled to each other so that they do not become disengaged from each other, but still pivotably couple to each other so that they can pivot relative to each 312, 314 other about an axis formed by the pivot pins 346, 348.

An upstanding wall that defines a cylindrical well 388 is formed in the rear portion of the interior surface 386 for receiving the second or lower end of the spring 318. A pair of longitudinal spines 390 extend in a spaced relationship generally from the well 388, to the forward portion 368 of the edge portion. The longitudinal spines 390 include a rearwardly positioned rest position portion 392 and a forwardly positioned longitudinal gripping surface 396. An additional pair of longitudinally extending outboard gripping spines 393 are also provided with included gripping surfaces 397.

The longitudinal gripping surface 396 is aligned with the longitudinal gripping members 354 of the top body member 312, so that the gripping members 354, 396 can cooperatively engage each other, and any object placed there between to enable the clip 300 to grip an object, such as a piece of paper or potato chip bag or the like.

The exterior surface 328 of the first body member 312 of includes a perimetral ridges of lip 402 that defines and frames a recessed decal, label, or printing surface area 404 on which a message or decoration may be placed. The exterior surface 408 of the second body member 314 includes a perimetral ridge 410 that defines a recessed cavity having 412 having a surface 444 on which a magnet 316 (FIG. 18) can be adhesively attached.

Having described the invention in detail with respect to certain preferred embodiments, it will be appreciated that variations and modifications exist within the scope and spirit of the present invention, and that the invention is only limited by the prior art and the claims.

What is claimed is:

1. A clip for selectively gripping objects comprising;
a first body member having a forward portion, a rearward portion, and a middle portion disposed between the forward and rearward portions, an exteriorly facing surface and an interiorly facing surface, the forward portion including a front surface, a first side surface and a second side surface, and including an interiorly facing gripping jaws, the middle portion including a first strengthening member,
a second body member having a forward portion, a rearward portion and a middle portion disposed between the forward and rearward portion, an exteriorly facing surface and an interiorly facing surface, the forward portion including an interiorly facing gripping jaw, the middle portion including a second strengthening member,
a biasing member for urging the gripping jaw of the first body member into engagement with the gripping jaw of the second body member,
a pivot assembly for pivotably coupling the first body member to the second body member to permit the gripping jaws of the first and second body members to pivot between an engaged position and a release position, wherein the pivot assembly includes a pin receiving aperture coupled to the first body member and a pivot pin coupled to the second body member and receivable within the pivot receiving aperture,
wherein the first strengthening member has an arcuately convex surface and the second strengthening member includes an arcuately concave surface sized and positioned to slidably engage the arcuately convex surface of the first body member,
wherein the first body member includes an interiorly extending perimetral lip extending along at least a portion of the front surface, first side surface and second side surface, and wherein the interiorly facing gripping jaws are formed on the perimetral lip along at least two of the front surface, first side surface and second side surface.

2. The clip of claim 1 wherein the convex surface of the first strengthening member is formed as a part of the perimetral lip and wherein the perimetral lip includes an edge portion that includes the arcuately convex surface of the first strengthening member, and wherein the second strengthening member includes a perimetral lip that includes the arcuately concave surface.

3. The clip of claim 2 wherein the arcuately convex surface and arcuately concave surface comprise load bearing surfaces for bearing loads imposed on at least one of the first and second body members to thereby reduce strain imposed on the pivot assembly by the imposed load.

4. The clip of claim 1 wherein the arcuately convex surface and the arcuately concave surface comprise load bearing surfaces for bearing loads imposed on at least one of the first and second body members to thereby reduce the stress imposed on the pivot assembly by the imposed load.

5. The clip of claim 4 wherein one of the arcuately concave surface and arcuately convex surface includes a trench and the other of the concave arcuate surface and convex arcuate surface includes a ridge configured to being slideably engageable into the trench for maintaining the engagement between the first and second strengthening member.

6. The clip of claim 5 wherein the pivot assembly includes an interiorly extending base member coupled to the first body member and including a pin receiving aperture, and a pivot pin coupled to the second body member and receivable by the pin receiving aperture for pivotably coupling the first and second body members.

7. The clip of claim 1 wherein the pivot assembly includes an interiorly extending base member coupled to the second body member, the base member including a pivot pin sized and positioned for reception by the pin receiving aperture of the first body member.

8. The clip of claim 7 wherein the first body member includes an interiorly extending perimetral lip, and wherein the perimetral lip includes the pin receiving aperture.

9. The clip of claim 1 wherein the pivot assembly includes a first body member base member extending interiorly from the interior surface of the first body member, and a second body base member extending interiorly from the interior surface of the second body member, wherein one of the first and second body base members include a pivot pin receiving aperture, and the other of the first and second body base member includes a pivot pin sized and positioned for being received by the pivot pin receiving aperture.

10. The clip of claim 9 wherein the first body member base member includes a convexly arcuate surface, and the second body base member includes a concavely arcuate surface sized and configured for slidably receiving the convexly arcuate surface of the base member of the first body member, the convexly arcuate surface and the concavely arcuate surface comprise the strengthening members.

11. The clip of claim 1 wherein the pivot assembly comprises
an interiorly extending base member coupled to the second body member, the interiorly extending base member including a second pivot pin receiving aperture, and
wherein the pivot pin is sized and configured for being received by the first and second pivot pin receiving apertures for pivotably coupling the first and second body members.

12. The clip of claim 11 wherein the interiorly extending base member includes a first interiorly extending base member having the second pivot receiving aperture and a second interiorly extending base member having a third pivot pin receiving aperture, where the pivot pin is sized and configured for being received by the first, second and third pivot pin receiving aperture for pivotably coupling the first and second body members.

13. A clip member for selectively gripping objects, the clip member comprising
a first body member having an exterior surface and an interior surface
a second body member having an exterior surface and an interior surface
a pivot assembly for pivotably coupling the first body member and second body member to permit the first and second body members to pivot between a jaw engaging position and a jaw release position, wherein the pivot assembly includes a pin receiving aperture coupled to the first body member and a pivot pin coupled to the second body member and receivable within the pivot receiving aperture
a biasing member for biasing the first and second body members into the jaw engaging position, and
and a strengthening member, the strengthening member includes an interiorly facing convexly arcuate surface disposed on the first body member, and an interiorly facing concavely arcuate surface disposed on the second body member and sized and configured to slideably engage the convexly arcuate surface for bearing loads imposed on at least one of the first and second body members to reduce the strain imposed by the load on the pivot assembly, wherein the biasing member comprises a coil spring having a first end and a second end, and wherein one of the first and second members includes a wall defining a well for serving as a seat for one of the first and second ends of the spring.

14. The clip of claim 13 wherein the coil spring has an axis that extends in a direction between the rear portion of the first body member and the rear portion of the second body member, generally perpendicular to a pivot axis formed by the pivot assembly.

15. The clip of claim 1 wherein the first body member further comprises at least one longitudinally extending gripping spine disposed between the first and second side surfaces of the perimetral lip, the gripping spine being sized and configured for gripping an object being held by the clip.

16. The clip of claim 15 wherein the gripping spine includes an upper surface disposed at generally the same height as an upper surface of the perimetral lip, and wherein the gripping spine extends upwardly from an interior surface of the first body member.

17. The clip of claim 16 wherein the forward portion of the second body member includes a front surface, a first side surface and a second side surface, and includes an interiorly extending perimetral lip extending along at least a portion of the front surface, first side surface and second side surface, and wherein the interiorly facing gripping jaws are formed on the perimetral lip along at least two of the front surface, first side surface and second side surface, the perimetral lip being sized and configured so that at least a portion of two of the front surface, first side surface and second side surface of the perimetral lip of the second body portion engage the perimetral lip of the first body portion.

18. The clip of claim 17 wherein the second body member further comprises at least one longitudinally extending gripping spine disposed between the first and second side surfaces of the perimetral lip, the gripping spine being sized and configured for gripping an object being held by the clip, and being sized and configured for engaging the gripping spine of the first body member.

19. The clip of claim 1 wherein the biasing member comprises a coil spring having a first end and a second end, and wherein one of the first and second members includes a wall defining a well for serving as a seat for one of the first and second ends of the spring.

20. The clip of claim 19 wherein the coil spring has an axis that extends in a direction between the rear portion of the first body member and the rear portion of the second body member, generally perpendicular to a pivot axis formed by the pivot assembly.

* * * * *